(12) United States Patent
Somers et al.

(10) Patent No.: US 11,994,858 B2
(45) Date of Patent: May 28, 2024

(54) SAFE SYSTEM OPERATION USING CPU USAGE INFORMATION

(71) Applicant: Zoox, Inc., Foster City, CA (US)

(72) Inventors: Robert Edward Somers, Sunnyvale, CA (US); Thomas Michael Flanagan, San Jose, CA (US); Andrew Lewis King, Los Altos, CA (US); Arpan Silas Rajan, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/699,986

(22) Filed: Mar. 21, 2022

(65) Prior Publication Data

US 2022/0276649 A1 Sep. 1, 2022

Related U.S. Application Data

(63) Continuation of application No. 16/226,128, filed on Dec. 19, 2018, now Pat. No. 11,281,214.

(51) Int. Cl.
| | |
|---|---|
| *G05D 1/00* | (2006.01) |
| *G06F 16/903* | (2019.01) |
| *G07C 5/04* | (2006.01) |

(52) U.S. Cl.
CPC ......... *G05D 1/0066* (2013.01); *G05D 1/0088* (2013.01); *G05D 1/0223* (2013.01); *G06F 16/903* (2019.01); *G07C 5/04* (2013.01)

(58) Field of Classification Search
CPC ......... B60W 60/00186; B60W 50/035; B60W 50/045; G05D 1/0088; G05D 1/0223; G05D 1/0061; G05D 1/0066; G05D 1/0214; G06F 16/903; G07C 5/04
See application file for complete search history.

(56) References Cited

U.S. PATENT DOCUMENTS

| | | |
|---|---|---|
| 6,349,406 B1 | 2/2002 | Levine |
| 6,557,167 B1 | 4/2003 | Thelen |
| 7,729,827 B2 | 6/2010 | Sakurai et al. |
| 9,003,028 B2 | 4/2015 | Fukui et al. |
| 2005/0120104 A1 | 6/2005 | Boon et al. |
| 2006/0031695 A1 | 2/2006 | Isozaki et al. |
| 2008/0049633 A1 | 2/2008 | Edwards et al. |

(Continued)

FOREIGN PATENT DOCUMENTS

| | | |
|---|---|---|
| CN | 1734438 A | 2/2006 |
| EP | 1388474 A2 | 2/2004 |

(Continued)

OTHER PUBLICATIONS

Extended European Search Report dated Dec. 13, 2022 for European Patent Application No. 19899245.5, 13 pages.

(Continued)

*Primary Examiner* — Truc M Do
(74) *Attorney, Agent, or Firm* — Lee & Hayes, P.C.

(57) ABSTRACT

Performance anomalies in complex systems can be difficult to identify and diagnose. In an example, CPU-usage associated with one or more of the systems can be determined. An anomalous event can be determined based on the determined CPU-usage. In some examples, based at least in part on determining the event, the system may be controlled in a safe state and/or reconfigured to obviate the anomalous event.

20 Claims, 9 Drawing Sheets

(56) References Cited

U.S. PATENT DOCUMENTS

| | | |
|---|---|---|
| 2012/0036250 A1 | 2/2012 | Vaswani et al. |
| 2012/0303348 A1 | 11/2012 | Lu et al. |
| 2013/0111012 A1 | 5/2013 | Gupta et al. |
| 2013/0160024 A1 | 6/2013 | Shtilman et al. |
| 2013/0204484 A1 | 8/2013 | Ricci |
| 2014/0215058 A1 | 7/2014 | Vicat-Blanc et al. |
| 2014/0320500 A1 | 10/2014 | Fletcher et al. |
| 2014/0333468 A1* | 11/2014 | Zhu ................ G01S 13/867 342/54 |
| 2015/0066282 A1 | 3/2015 | Yopp |
| 2015/0246672 A1 | 9/2015 | Pilutti et al. |
| 2016/0180811 A1 | 6/2016 | Colenbrander |
| 2017/0124129 A1 | 5/2017 | Chen et al. |
| 2017/0293295 A1 | 10/2017 | Tani |
| 2018/0011485 A1 | 1/2018 | Ferren |
| 2018/0046671 A1 | 2/2018 | Baba et al. |
| 2018/0050704 A1 | 2/2018 | Tascione et al. |
| 2018/0060127 A1 | 3/2018 | Esterkin et al. |
| 2018/0102947 A1 | 4/2018 | Bhaya et al. |
| 2018/0197418 A1 | 7/2018 | Chu et al. |
| 2018/0304828 A1 | 10/2018 | Kitani |
| 2018/0316699 A1* | 11/2018 | David ................ H04W 4/02 |
| 2018/0349205 A1 | 12/2018 | Kolluru |
| 2018/0356837 A1 | 12/2018 | Lisewski et al. |
| 2019/0152472 A1 | 5/2019 | Aksyutina et al. |
| 2019/0156678 A1 | 5/2019 | Cole |
| 2019/0340094 A1* | 11/2019 | Lu ................ H04L 63/1441 |
| 2019/0364502 A1 | 11/2019 | Agerstam et al. |
| 2019/0382031 A1 | 12/2019 | Hu et al. |
| 2020/0068434 A1 | 2/2020 | Pedersen et al. |
| 2020/0201322 A1 | 6/2020 | Somers et al. |
| 2020/0201335 A1 | 6/2020 | Somers et al. |
| 2020/0201336 A1 | 6/2020 | Myers et al. |

FOREIGN PATENT DOCUMENTS

| | | |
|---|---|---|
| EP | 3203339 | 8/2017 |
| JP | 2007126127 A | 5/2007 |
| JP | 2013047922 A | 3/2013 |
| JP | 2017074887 A | 4/2017 |
| JP | 2018109900 A | 7/2018 |
| RU | 2010121514 A | 12/2011 |
| WO | WO03060416 | 7/2003 |
| WO | WO2014024863 A1 | 2/2014 |
| WO | WO2017079321 A1 | 5/2017 |
| WO | WO2017079349 A1 | 5/2017 |
| WO | WO2017148239 A1 | 9/2017 |
| WO | WO2018014282 A1 | 1/2018 |
| WO | WO2018066041 A1 | 4/2018 |
| WO | WO2018138775 A1 | 8/2018 |

OTHER PUBLICATIONS

Partial European Search Report dated Aug. 1, 2022 for European Patent Application No. 19899245.5, 13 pages.

Office Action for U.S. Appl. No. 16/226,275, dated Aug. 16, 2022, Myers, "Transition to Safe State based on Age/Integrity of Critical Messages", 21 pages.

Non Final Office Action dated Aug. 14, 2020 for U.S. Appl. No. 16/226,275, "Transition to Safe State based on Age/Integrity of Critical Messages", Myers, 11 pages.

Non Final Office Action dated Dec. 23, 2020 for U.S. Appl. No. 16/225,997, "Safe System Operation Using Latency Determinations" Somers, 19 pages.

Office Action for U.S. Appl. No. 16/226,275, dated Feb. 10, 2022, Myers, "Transition to Safe State based on Age/Integrity of Critical Messages", 17 Pages.

Office Action for U.S. Appl. No. 16/226,128, dated May 27, 2021, Somers, "Safe System Operation Using CPU Usage Information ", 7 pages.

Office Action for U.S. Appl. No. 16/226,275, dated Aug. 24, 2021, Myers, "Transition to Safe State based on Age/Integrity of Critical Messages", 13 pages.

The PCT Search Report and Written Opinion dated Apr. 8, 2020 for PCT Application No. PCT/US2019/067506, 23 pages.

The PCT Search Report and Written Opinion dated Mar. 19, 2020 fo PCT Application No. PCT/US2019/067584, 7 pages.

The Chinese Office Action dated May 15, 2023 for Chinese patent application No. 201980084468.4, a foreign counterpart of U.S. Pat. No. 11,099,573, 22 pages.

Wu, et al., "An Out-of-band Authentication Scheme for Internet of Things Using Blockchain Technology," IEEE 2018 International Conference on Computing, Networking, and Communications (ICNC), Maui, HI, USA, 2018, pp. 769-773.

Office Action for U.S. Appl. No. 16/226,275, dated Sep. 13, 2023, Matthew Thomas Myers, "Transition to Safe State based on Age/Integrity of Critical Messages", 23 pages.

Japanese Office Action mailed Dec. 12, 2023 for Japanese Application No. 2021-535709, a foreign counterpart to U.S. Pat. No. 11,099,573, 9 pages.

Yajima, et a, "CAN Security System that enables Vehicle Stopping Safely after Detecting Attack", Symposium on Cryptography and Information Security, Jan. 21, 2016, pp. 1-6.

\* cited by examiner

SAFE SYSTEM OPERATION USING CPU USAGE INFORMATION

RELATED APPLICATION

This is a continuation application that claims priority to commonly assigned, co-pending U.S. patent application Ser. No. 16/226,128, filed Dec. 19, 2018. The entire contents of application Ser. No. 16/226,128 are fully incorporated herein by reference.

BACKGROUND

Various systems, such as autonomous vehicles, involve many computing systems receiving, generating and outputting different data. In the case of autonomous vehicles, for example, such data is necessary for navigating safely through an environment. Such data may include sensor systems that capture information about an environment, perception systems that generate information about objects in the environment from the sensor data, and control systems that cause those systems to perform various operations (for example, control systems which cause the vehicle to follow routes generated by a planning system), to name only a few. Each of these systems requires its own processing and functionality. However, in some instances, because of the interconnectedness and/or the complexity of the system(s), identifying a source of an error in operation can be difficult. For instance, as software is updated and/or systems are altered, it can be difficult to identify and troubleshoot sources of increased latency and/or increased CPU usage. In some examples, these shortcomings may cause one or more of the systems to malfunction, which may result in unsafe operation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
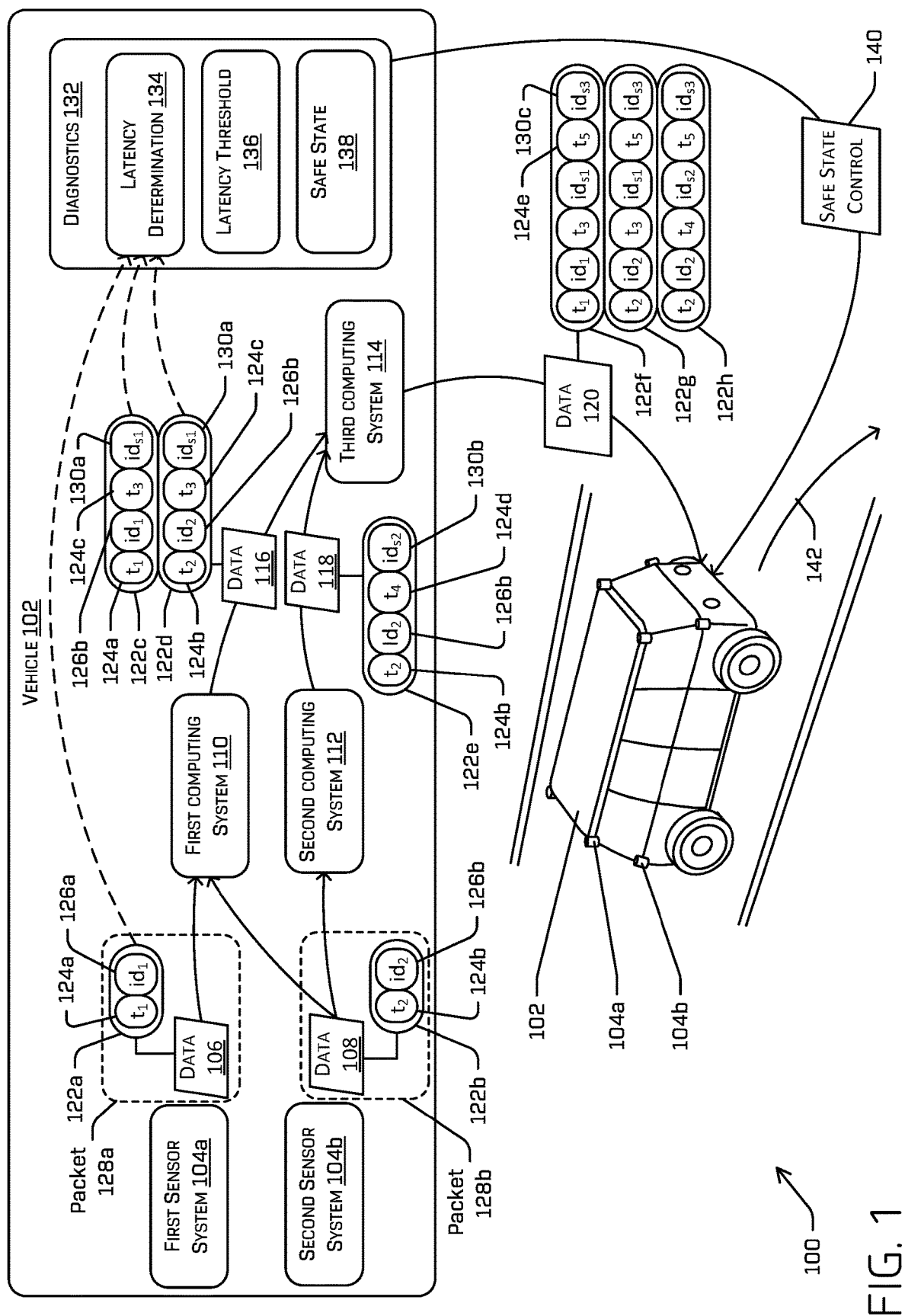
FIG. 1 illustrates an example vehicle, such as an autonomous vehicle, and example components for confirming that systems of the autonomous vehicle are operating within safe parameters and for transitioning the vehicle to a safe state in response to determining an anomalous event affecting the systems, as described herein.

This disclosure describes methods, apparatuses, and systems for determining latency and resource usage for complex systems and identifying responses therefore. In illustrative examples described herein, such responses may comprise, for example, controlling a vehicle in response to detecting anomalous events at the vehicle. For example, an autonomous vehicle may include a number of computing systems, each requiring different data inputs, generating different data outputs, and generally necessary for proper and safe operation of the vehicle. Because of the interconnectedness of the system(s) as well as the volume of functions being performed and data being generated, it is desirable to ensure that all systems are functioning properly.

In some cases, a system-by-system (or subsystem-by-subsystem) latency can be determined by receiving tag information from data (or data packet) instances. For example, in implementations described herein, systems may tag generated data with a unique identifier and timestamp information. For example, the timestamp information may include one or more of a time at which data used to create the generated data was received, a time at which the data was generated, and/or a time at which the data was output by the system. As that generated data is used in the generation of new data, e.g., as the data propagates from system to system (or subsystem to subsystem), the unique identifier may be further associated with this downstream data. In some examples, techniques described herein can use the tag information to determine a system latency, e.g., by comparing timestamp information associated with the receipt of input data at a system with timestamp information associated with generation and/or output of new data generated using the input data.

In some examples, a latency determined according to techniques described herein can be compared to an expected or operational latency range. If the determined latency is within the operational latency range, the vehicle may be functioning properly. However, if the determined latency is outside of the operational latency range, techniques described herein may identify a latency-related event. Moreover, in some implementations, the techniques described herein can control the vehicle in a safe state in response to the event. For example, controlling the vehicle in the safe state may include taking one or more actions to mitigate the latent data. Such actions can include slowing the vehicle, issuing a warning, and/or executing a safe stop trajectory, for example.

Techniques described herein can also be used to determine an expected or operational latency range. For example, in some instances, latency of a system or systems may be determined over a period of time and that data may be characterized, e.g., as a distribution. A function representing that distribution may be used to identify an operational latency range for the system(s). In some examples, the operational range may be a range that includes a statistically significant number of all measured latencies.

In other examples, techniques described herein can determine CPU-usage information for one or more systems on an autonomous vehicle. For example, some implementations include generating a data structure representative of all processes running on the vehicle. The data structure can be one or more prefix trees in which each node represents a function and branches represent functions in a process. In some examples, the techniques described herein can also generate a symbol table associating each function with a unique function identifier, such that nodes in the prefix tree include one of the unique function identifiers. Some examples may also associate a unique node ID with each node in the prefix tree.

Example techniques described herein can also sample operation of the system, e.g., to determine functions operating on a CPU at a periodic sampling time. In some examples, the sampling can identify, for each sample, the unique node ID associated with the on-CPU function. The unique node ID may also be associated with a timestamp corresponding to the sampling time. For example, sampling packets comprising the read-out unique node ID and a timestamp can be stored. These sampling packets can be used to determine CPU usage for any time period, including, but not limited to, a stack trace associated with any function for any given time. For instance, by retrieving packets associated with a time period (as determined by the timestamp information), the unique node IDs can be used to recreate the stack traces associated with the on-CPU functions. In some examples, the time period may be a time range that includes a latency-related event, as described above.

The CPU-usage information can also be used to determine an expected CPU-usage for a system. For example, CPU usages determined according to the examples just described can be aggregated over a period of time, e.g., a runtime, a windowed time, or operational time of the vehicle. An operational CPU-usage range can be a range in which the system operation over a statistically-significant number of sampled times. In other instances, examples described herein can determine CPU-usage in real-time or near-real-time and compare the determined CPU-usages to the threshold range. In some examples, if the determined CPU-usage is outside of the threshold range, a CPU-based event can be determined. Moreover, in some implementations, the techniques described herein can control the vehicle in a safe state in response to the event. For example, controlling the vehicle in the safe state may include taking one or more actions to mitigate the event. Such actions can include slowing the vehicle, issuing a warning, and/or executing a safe stop trajectory, for example Techniques described herein may be directed to leveraging data to enable a vehicle, such as an autonomous vehicle, to navigate through an environment while circumventing objects in the environment. Techniques described herein can utilize information about data and system functionality to ensure that systems have the data they need and are operating within parameters that provide safe operation of the vehicle as it travels through the environment. Moreover, techniques described herein may be faster and/or more robust than conventional techniques, as they may increase the reliability of system functioning. That is, techniques described herein provide a technological improvement over existing navigation technology. Techniques described herein can also provide a smoother ride and improve safety outcomes by, for example, more accurately providing safe passage to an intended destination.

In other examples, in which this disclosure is directed to an autonomous vehicle, techniques described herein can assist in planning and/or testing system functions prior to deploying the autonomous vehicle in an environment. For example, techniques described herein can be used to compare performance parameters for new software versions, new system or subsystem components, or other changes. Based on this comparison, techniques can allow for improved system design and/or performance. Moreover, in this example, data about the new software, component or the like can be used to determine safe parameters or ranges for safe operation of the vehicle using the new software, the new system component(s), or the like. Subsequent performance may be measured against the determined parameters, for example.

While this disclosure uses an autonomous vehicle in examples, techniques described herein are not limited to application in autonomous vehicles. In some instances, techniques described herein can be used to determine and/or characterize performance parameters, e.g., latency and/or resource usage for any of a number of complex systems. Moreover, techniques descried herein may be used to identify and/or mitigate anomalous functioning, e.g., events, in such complex systems. In some examples, any complex system that includes interrelated systems that perform functions and/or pass messages may benefit from the techniques described. By way of non-limiting example, techniques described herein may be used on airborne and/or ground-borne vehicles, as well as other fully- or partly-autonomous robotic systems. Moreover, non-autonomous vehicles could also benefit from techniques described herein, e.g., for safety in the absence of viable data.

FIGS. 1-9 provide additional details associated with the techniques described herein.

FIG. 1 illustrates an example environment 100 through which an example vehicle 102 is traveling. The example vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for the entire trip, with the driver (or occupant) not being expected to control the vehicle at any time. In such examples, because the vehicle 102 can be configured to control all functions from start to completion of the trip, including all parking functions, it may not include a driver and/or controls for driving the vehicle 102, such as a steering wheel, an acceleration pedal, and/or a brake pedal. This is an example, and the systems and methods described herein may be incorporated into any systems having complex subsystem and/or inter-system communications. As non-limiting examples, such systems may comprise ground-borne, airborne, or waterborne vehicle, including those ranging from vehicles that need to be manually controlled by a driver at all times, to those that are partially or fully autonomously controlled. In some instances, the techniques can be implemented in any system that includes one or more computing systems performing functions. As will be appreciated from the description herein, this disclosure is not limited to vehicles.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions, for example, such that a first end of the vehicle 102 is the front end of the vehicle 102 when traveling in a first direction, and such that the first end becomes the rear end of the vehicle 102 when traveling in the opposite direction. Similarly, a second end of the vehicle 102 is the front end of the vehicle when traveling in the second direction, and such that the second end becomes the rear end of the vehicle 102 when traveling in the opposite direction. These example characteristics may facilitate greater maneuverability, for example, in small spaces or crowded environments, such as parking lots and/or urban areas.

The example vehicle 102 can be used to travel through the environment 100 and collect data. For example, the vehicle 102 can include one or more sensor systems, including a first sensor system 104a and a second sensor system 104b (herein referred to collectively and/or with other, unlabeled sensor systems, the sensor systems 104). The sensor systems 104 can include, for example, LIDAR sensors, RADAR sensors, SONAR sensors, time-of-flight sensors, image sensors, audio sensors, infrared sensors, location sensors, etc., or any combination thereof. The sensor systems 104 may be disposed to capture, e.g., generate, sensor data associated with the environment 100. In the illustrated example, the first sensor system 104a may generate first sensor data 106 and the second sensor system(s) 104b may generate second sensor data 108. For example, the first sensor system(s) 104a can include a LiDAR sensor, in which case the first sensor data 106 may include a point cloud, and the second sensor system(s) 104b can include a camera, in which case the second sensor data 108 may include image data. These examples are for illustration only, as the sensor system(s) 104 may include any number, type and/or modality of sensor system(s).

The vehicle 102 can also include one or more computing systems. For example, FIG. 1 illustrates a first computing system 110, a second computing system 112, and a third computing system 114 (collectively referred to herein, and including additional computing systems not shown, as the computing system(s) 110, 112, 114). Although these three example systems are illustrated, the vehicle may include more, fewer, and/or other systems. Though depicted in FIG. 1 as separate systems for illustrative purposes, such computing systems may comprise virtual machines, processes, or the like running on one, two, three, or more computing systems. An example computing system of the computing systems 110, 112, 114 can include one or more of a localization system, a perception system, a planning system, a system controller, an emitter, a mapping system, or the like. Some of these and other example systems (which may be components and/or subsystems) are detailed further herein, including with reference to FIG. 5. In other examples, the computing system(s) 110, 112, 114 can also or alternatively include a system communicating with the vehicle 102, e.g., via a wired or wireless connection. The computing system(s) 110, 112, 114 may be configured to perform one or more processes e.g., by executing one or more functions, and may use data to perform those functions. For instance, as illustrated in FIG. 1, the first computing system 110 may be configured to receive the first sensor data 106 and the second sensor data 108 and generate an output comprising data 116. Similarly, the second computing system 112 may be configured to receive the second sensor data 108 and generate an output comprising data 118. The third computing system 114 may be configured to receive the data 116 generated by the first computing system 110 and the data 118 generated by the second computing system 112 and generate an output comprising data 120. In some examples, the data 120 can be drive control data for controlling operation of the vehicle, as generally shown in FIG. 1.

As also illustrated in FIG. 1, in implementations of this disclosure additional information can be associated with the various types of data associated with the vehicle 102. For example, data in the system can be tagged upon receipt, generation, and/or transmission with one or both of timestamp information and/or a unique identifier. As shown in FIG. 1, an instance of the data 106 generated by the first sensor system 104a may have an associated first tag 122a that includes first timestamp information $(t_1)$ 124a and a first unique ID $(id_1)$ 126a. The first timestamp information 124a may include a time at which the data 106 was captured, e.g., a time at which a sensor of the first sensor system 104a was read out, and/or a time at which the data was sent, e.g., transmitted or published, by the first sensor system 104a. The first unique ID 126a may be an integer or other identifier that is unique to the instance of the data 106. Thus, for example, the data 106 may be generated periodically by the first sensor system 104a and each instance of the data 106 may have a different unique ID. As described further throughout this disclosure, instances of the data 106 may be tracked as it propagates through the various computing system(s) using information included in the tag 122a. In the illustrated example, the first sensor system 104a can output the data 106 and the tag 122a as a first data packet 128a.

Similar to the data 106, the data 108 generated by the second sensor system 104b may also include a second tag 122b that includes second timestamp information $(t_2)$ 124b and a second unique ID $(id_2)$ 126b. For example, the second timestamp information 124b may include a time at which the data 108 was captured by the second sensory system 104b and/or a time at which the data was sent from or published by the second sensor system 104b. For instance, the data 108 may be output as a data packet 128b including the data 108 and the tag 122b. The second unique ID 126b may be an integer or other identifier that is unique to each instance of the data 108. The first unique ID 126a and the second unique ID 126b may be sequentially generated integers, for example. Moreover, in some instances, the unique IDs 126 and/or other information contained in the tags 122 may identify the source of the data, e.g., identify the first computing system 104a as the source of each instance of the data 106 and/or identify the second computing system 104b as the source of each instance of the data 108. As a non-limiting example, the first 2, 3, or 4 digits and/or alphanumeric characters may provide be associated with the system that generated the message, when the message was generated, and the like.

FIG. 1 also illustrates how tags are appended and/or updated as the data 106, 108 propagates through the system(s) of the autonomous vehicle 102. For example, and as illustrated, tags 122c, 122d are associated with the data 116 generated by the first computing system 110, a tag 122e is associated with the data 118 generated by the second computing system 112, and tags 122f, 122g, 122h are associated with the data 120 generated by the third computing system 114. For instance, the tags 122c, 122d associated with the data 116 can include some or all of the information contained in the respective tags 122a, 122b, as well as third timestamp information $(t_3)$ 124c and a first system identification information (id$_{s1}$) 130a. Thus, and as illustrated, the tag 122c can include the first unique ID 126a, the first timestamp information 124a, the third timestamp information 124c, and the system identification information 130a. Similarly, the tag 122d can include the second timestamp information 124b, the second unique ID 126b, the third timestamp information 124c, and the system identification information 130a. In this example, the first computing system 110 generates the data 116 using both the data 106 from the first sensor system 104a and the data 108 from the second sensor system 104b. Thus, the tag 122a and the tag 122b associated, respectively, with the input data 106 and the input data 108 may be updated to indicate this processing by the first computing system 110, e.g., generating the tags 122c, 122d, which include the third timestamp information 124c and the system identification information 130a.

In the example of FIG. 1, all information from the tag 122a is illustrated as being retained in the tag 122c and all information from the tag 122b is illustrated as being retained in the tag 122d. In other implementations, however, some data may not be copied or carried over. By way of non-limiting example, the timestamp information 124a, 124b may be omitted from the tags 122c, 122d. In this example, the omitted timestamp information 124a 124b may be accessible via the tags 122a, 122b, instead of via the tags 122c, 122d. Moreover, although the tags 124a, 124d are illustrated as containing the same third timestamp information (t$_3$) 124c and the same system identification information (id$_{s1}$), that information may be different. For example, the third timestamp information 126c can include one or more timestamps associated with one or more of receipt of the data 106, receipt of the data 108, generation of the data 116, and/or output, e.g., publication, of the generated data 116. In one example, when the third timestamp information 124c includes the time at which the data 106 or the data 108 is received at the first computing system 110. Such data could be received at different times and thus the time stamp information 124c may have different values for the two tags 122c, 122d. Similarly, the first computing system 110 may perform a number of operations, which could use the first data 106 and the second data 108 at different times. These "processing" times could similarly be stored as the timestamp information 124c. Also in examples, the system identification information 130a may include more or other than just an identification of the first computing system. For instance, the system identification information 130a may indicate processes performed by the first computing system 110, and such processes may be different for the data 106, 108. In implementations, the timestamp information 124c and the system identification information 130a may be the same because the they are added by, or otherwise associated with, the first computing system 110. Although not illustrated, the data 116 and the associated tags 122c, 122d can be output as a data packet.

The tag 122e associated with the data 118 similarly includes the second timestamp information 124b and the second unique ID 126b (because the data 118 is generated using the data 108 generated by the second sensor system 104b), in addition to fourth timestamp information (t$_4$) 124d and second system identification information (id$_{s2}$) 130b. Like the third timestamp information 124c, the fourth timestamp information 124d can include information about one or more times associated with the second computing system 112. Such times may be one or more of a time at which the data 108 is received at the second computing system 112, a time at which the data 108 is acted on, e.g., processed or the like, by the second computing system 112, a time at which the data 118 is generated, and/or a time at which the data 118 is transmitted, output, published, or otherwise made available. Moreover, the second system identification information 130b may identify the second computing system 112 generally and/or provide information about one or more processes or functions at the second computing system 112, e.g., which may have acted on or otherwise been associated with the data 108. The data 118 and the tag 122e can be output by the second computing system 112 as a packet.

Similarly, the third computing system 114 can update or generate new timestamps, e.g., to show the propagation or "flow" of the data 106, 108 through the systems of the vehicle 102. For example, a tag 122f may generally correspond to the tag 122c, a tag 122g may generally correspond to the tag 122d, and a tag 122h may generally correspond to the tag 122e. However, those tags further include fifth timestamp information (t$_5$) 124e and third system identification information (id$_{s3}$) 130c. The fifth timestamp information 124e can include one or more timestamps associated with one or more of receipt of the data 116 (or a packet containing the data), receipt of the data 118, generation of the data 120, and/or output of the generated data 120 (e.g., as a data packet), which, as noted above, may be control data for controlling the vehicle 102. The third system identification information 130c can identify the third computing system 114 and/or components, processes, and/or aspects thereof that may process or otherwise use the data 116 and/or the data 118. As with the tags associated with the data 116 and discussed above, the fifth timestamp information 124e and the third system identification information may be different in one or more of the tags 122f, 122g, 122h, despite being illustrated the same. As used throughout this disclosure, two or more of the tags 122a, 122b, 122c, 122d, 122e, 122f, 122g, 122h and/or other tags generated according to examples described herein may be referred to as "the tags 122." Moreover, although the term "tag" is used herein for ease of reference, tag may generally be understood to include, without limitation, any information, including the timestamp information, the unique IDs or other information. Stated differently, a "tag" may be information appended to or otherwise associated with data. Similarly, multiple occurrences of timestamp information may be referred to as "the timestamp information 124," multiple occurrences of unique IDs may be referred to as "the unique IDs 126," and multiple occurrences of packets 128 may be referred to as "the packets 128."

According to the architecture just described, each instance of data may be tracked using the tags 122. For example, in order, the tags 122a, 122c, and 122e may be used to track some instance of the data 106 from generation by the first sensor system 104a to output as control data 120. Similarly, in order, the tags 122b, 122d, and 122g can illustrate a first flow for an instance of the data 108, and, in order, the tags 122b, 122e, 122h can illustrate a second flow for the same instance of the data 108.

As detailed further herein, techniques of this disclosure can use information about the data, e.g., the tags 122, to determine, characterize, and/or investigate performance parameters of the vehicle 102. For example, techniques can determine latency associated with the system(s) of the vehicle 102. In one example, a latency associated with the illustrated instance of the data 106 at the first sensor system 104a can be determined using the first timestamp information 124a. For instance, a latency associated with the data 106 may be a difference between a time at which the data 106 is captured by the first sensor system 104a and a time at which the packet 128a is output by the first sensor system 104a, which times may be included in the first timestamp information 124a. In implementations, the first sensor system 104a may continually capture and output new packets including new instances of data 106, e.g., at a predetermined frequency, such as at a frame rate of the first sensor system 104a. Each of the packets including the data 106 may have an associated first unique ID 126, which may be integers, for example, and a separate latency can be determined based on each instance of the data 106.

In another non-limiting example, a latency of the first computing system 110 may be calculated by investigating the third timestamp information 124c associated with either or both of the tag 122c and the tag 122d. For example, a latency associated with the first computing system 110 may be calculated as a difference between a time at which the data 116 is published by the first computing system 110 and a time associated with receiving the data 106 and/or the data 108 at the first computing system 110. For instance, because the data 116 includes both the tag 122c and the tag 122d, those tags can be investigated to determine the instance(s) of those data 106, 108 used to generate the data 116. Using information about those instances, e.g., a time at which each is received at the first computing system 110, a latency for the first computing system 110 can be determined. In some examples, a latency of the first computing system 110 can be a difference between a time at which the data 116 is published and the earliest time at which any instance of the data 106 or the data 108 used to generate the data 116 is received at the first computing system 110.

As should be apparent from the above, such a technique to determine latency can be used for complex (e.g., non-linear) systems where latency cannot be determined by measuring a total execution time. Further, as illustrated and described above, latencies can be determined for individual components, collections of components, and/or the system as a whole (e.g., the latency from sensor input to vehicle control of vehicle 102). In one example, because individual instances of data are tracked through the entire vehicle 102, it may be possible to determine that the vehicle is functioning within a predetermined latency, even when individual systems are not. Conventional systems may consider individual subsystems and, if one is functioning at a latency higher than expected, the system may be determined to be operating improperly. However, complex systems, like the autonomous vehicle, may suffer a latency event at one subsystem, but still function properly. For instance, consider an example in which a vehicle approaches an extremely busy intersection. The intersection may have scores of pedestrians waiting to cross or crossing in multiple directions, bicyclists, buildings, parked and moving vehicles, and other objects. In these instances, one or more systems of the vehicle that identify objects in the environment may take much longer than most other operating conditions. Because of the increased processing time necessary to identify all objects to ensure safe travel, the latency may be higher than expected (or tested) at that system. Techniques described herein, however, may be used to determine that other systems are functioning more quickly than normal, and therefore an overall latency of the vehicle may be within a safe operating range.

In some examples, the vehicle 102 may include a diagnostics system 132 that includes functionality for determining performance characteristics of one or more systems of the vehicle. System latency is an example of one performance characteristic. In some examples, the diagnostics system 132 can determine an anomalous event, e.g., when a performance characteristic is outside of an expected performance range and/or above/below a threshold. In some instances, the diagnostics system 132 can also control the vehicle 102 in response to determining that anomalous event. In the illustrated example, the diagnostics system 132 includes a latency determination component 134, a latency threshold component 136, and a safe state component 138.

The latency determination component 134 can receive the tags 122 associated with data generated by one or more systems of the vehicle 102. For clarity, FIG. 1 illustrates the latency determination component 134 receiving only the first tag information 122a and the third tag information 122c, although, in practice, the latency determination component 134 may receive all tag information at the vehicle 102, including but not limited to the second tag information 122b, the fourth tag information 122d, and the fifth tag information 122e. In other embodiments, the latency determination component 134 can also or alternatively receive other information, e.g., including the packets 128. In example embodiments, the latency determination component 134 can determine a latency associated with one or more computing systems. For example, latency determination component 134 may determine a latency for the second computing system 112 using the tag 122d, generally as discussed above. In at least some examples, the latency determination component 134 may perform a statistical analysis of the tags collected. As a non-limiting example, tags 122 may be aggregated over a defined window of time (e.g., 2 seconds—or otherwise determined based on a function of the vehicle, such as a speed of the vehicle) and statistical properties of the distribution (mean, variance/standard deviation, min, max, etc.) may be determined for any one or more of the computing systems 110, 112, 114 and/or combinations thereof. Thus, the latency determined by the latency determination component can be an instantaneous latency, e.g., associated with a single instance of data, or an aggregation of many instances. Regarding the latter, the determined latency can be determined using statistical analysis.

The latency threshold component 136 may include information about latency thresholds for each of the systems of the vehicle 102. For example, the latency threshold component 136 may determine whether a latency determined by the latency determination component 134 falls within a threshold or expected latency range. When the latency for one of the systems is outside of the expected range, the latency threshold component 136 may determine an anomalous performance event. As described further herein, the latency threshold component 136 may also be configured to determine the latency thresholds or ranges for one or more of the systems of the vehicle 102. For example, the latency threshold component 136 may receive historical data indicating actual latency data (which may include statistical data) for one or more the systems, and determine an acceptable operating range based on the historical latencies.

The safe state component 138 may receive event information from the latency threshold component 136, e.g., when the latency threshold component 136 detects an anomalous event, and institute one or more operations in response to the event. In the illustrated example, the safe state component 138 may control the vehicle 102 by issuing a safe state control 140. For example, the safe state control 140 can control the vehicle 102 to execute a safe stop maneuver. An example safe stop maneuver may include controlling the vehicle 102 to follow a trajectory 142, e.g., along which the vehicle 102 can safely navigate to the side of the road. Once on the side of the road, the vehicle 102 may be placed in a safety state, e.g., in which some or all functionality is disabled. The vehicle 102 may remain in this state until further diagnostics or the like are carried out, e.g., to determine a source of the anomalous latency event and/or to correct the event.

The safe state control 140 that causes the vehicle 102 to follow the trajectory 142 is only one example of a safe state control. In other examples, instead of bringing the vehicle 102 to a complete stop, the safe state component 138 may control the vehicle 102 to slow down. For example, travelling at a lower speed may be more tolerant of events, e.g., because an acceptable latency range may be larger at a slower speed.

Thus, FIG. 1 provides example techniques that may be implemented to determine latency on a system-by-system basis. In some examples, when the latency is outside of an expected latency range, an anomalous latency event can be identified, and a safe action can be taken in response to the action.

Figure 2A:
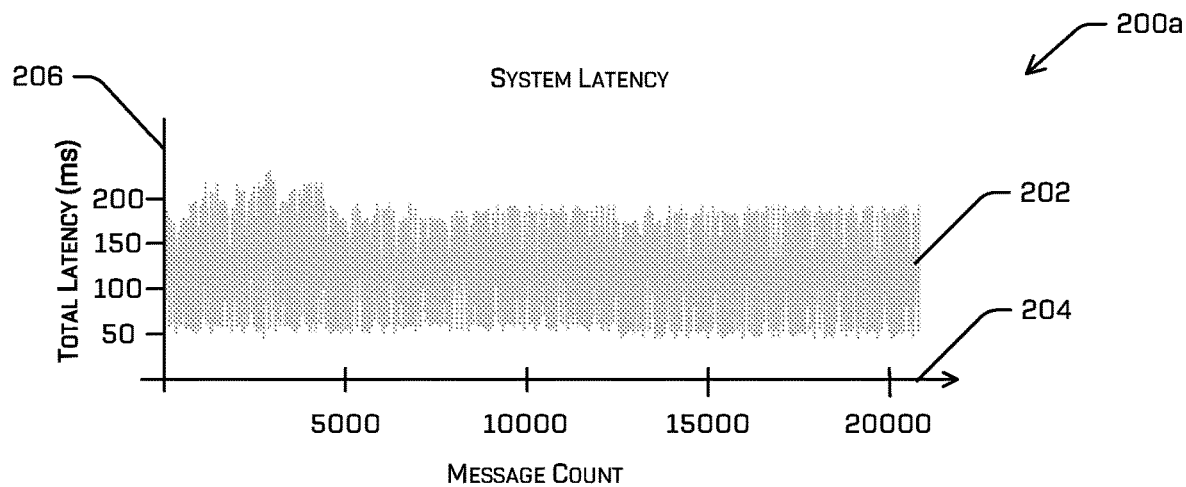
FIGS. 2A and 2B illustrate example graphs including, respectively, an aggregation of measured latency for information in a system and a distribution of the measured latencies, as described herein.
Figure 2B:
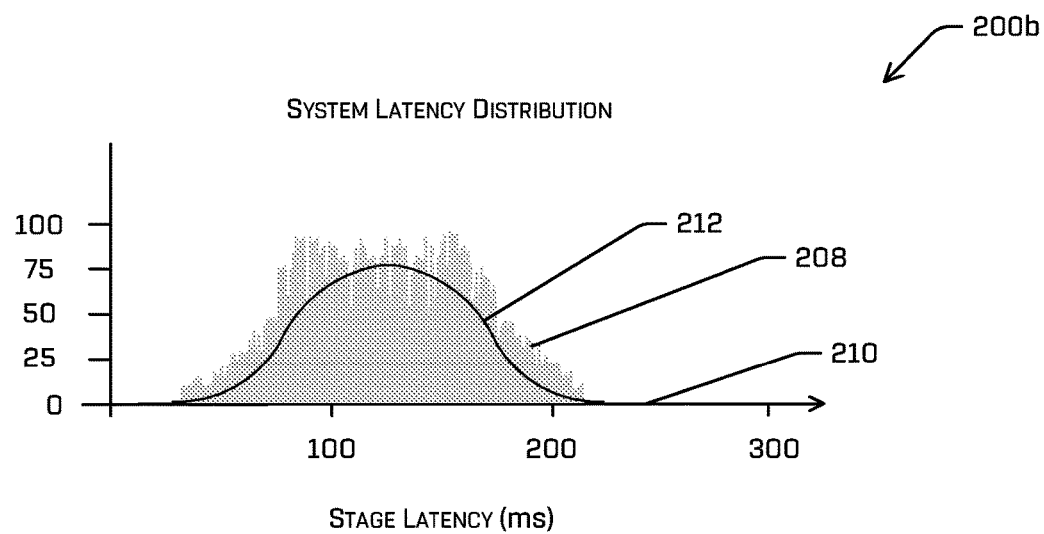

FIGS. 2A and 2B are graphs providing visualizations of latency data associated with one of the systems of the vehicle 102. More specifically, FIG. 2A shows a graph 200*a* illustrating an aggregation of latencies for a system, such as one of the computing systems 110, 112, 114. FIG. 2B includes a graph showing a distribution for the latency data illustrated in FIG. 2A, as well as a cumulative distribution function representative of the distribution.

The graph 200*a* of FIG. 2A illustrates aggregated data 202, which, in this example illustrates only latency information associated with a single system, e.g., the first computing system 110. Specifically, the x-axis 204 in FIG. 2A indicates a message count. In this example, each message in the message count is associated with an instance of data generated (and/or output) by the system. The y-axis 206 of the graph 200*a* shows a total latency, in ms in this example. Thus, the data 202 generally shows a plot of a system latency for each packet (or data) generated by the system. For example, the latency for the system can be determined using unique IDs and timestamp information, as described herein. For example, if the graph 200*a* depicts the first computing system 110, the latencies plotted in the graph 200*a* may be the difference between a time at which an instance of the data 106 or the data 108 is received at the first computing system 110 and a time at which an instance of the data 116 is output, e.g., published, by the first computing system 110. As illustrated, the average latency for the illustrated system is on the order of between about 50 ms and about 200 ms.

The second graph 200*b* illustrates the same data 202, as a distribution 208. More specifically, the second graph 200*b* shows the frequency of measured packets, e.g., messages, associated with latency values. For example, latency is plotted on the x-axis 210 and a distribution function 212, e.g., a Gaussian distribution, is fit to the distribution plot 208. The distribution function 212 provides a statistical analysis, based on runtime of the vehicle, of how long the system takes to perform its functions. As non-limiting examples, such statistical analysis may comprise a mean, variance/standard deviation, min, max, and the like. Knowledge of these operating parameters can allow for many diagnostic functions to be performed. For instance, when an expected operating latency is known, tracking latency in real-time or near-real-time can allow for ensuring that the vehicle is operating safely. As in the example of FIG. 1, determined latency (whether an instantaneous latency of a single tag and/or a statistical aggregation over a window) can be compared to the operating range, and when the system is outside of normal operating parameters, the vehicle can be controlled according to a safe state. In some examples, the range may be a range in which some statistically significant number of latency measurements falls. Thus, the distribution function 212 may determine that 95% or 99% or 100% of all latency occurrences are between 50 ms and 200 ms, and may use that range as an expected latency range.

Determining the expected latency range may also provide a useful tool for other purposes. For instance, an impact on changes to the system can be investigated using the latency range. In one example, the graphs 200*a*, 200*b* can be generated for different software versions to determine the effect those versions have on the system. As a non-limiting example, algorithms and/or hardware modifications of a computing system 110 may result in differing latency characteristics both for the computing system 110 and/or for the vehicle 102 as a whole. The techniques described herein allow inspection and characterization of such modifications to determine how they impact the vehicle 102 as a whole, despite a complex interaction between messages and systems. Similarly, the impact of new sensors, e.g., providing data to the system, can be determined. Moreover, the latency range information can be used in connection with designing downstream systems, which may rely on the data generated by the system.

According to the foregoing, latency data may be used to determine whether systems of a vehicle are functioning properly and/or to establish threshold ranges for safe operation of the vehicle. However, additional performance characteristics can also be used to identify anomalies and/or to understand operating conditions for the vehicle 102. For example, FIGS. 3, 4A, and 4B are used to describe CPU usage for a vehicle, like the vehicle 102.

Figure 3:
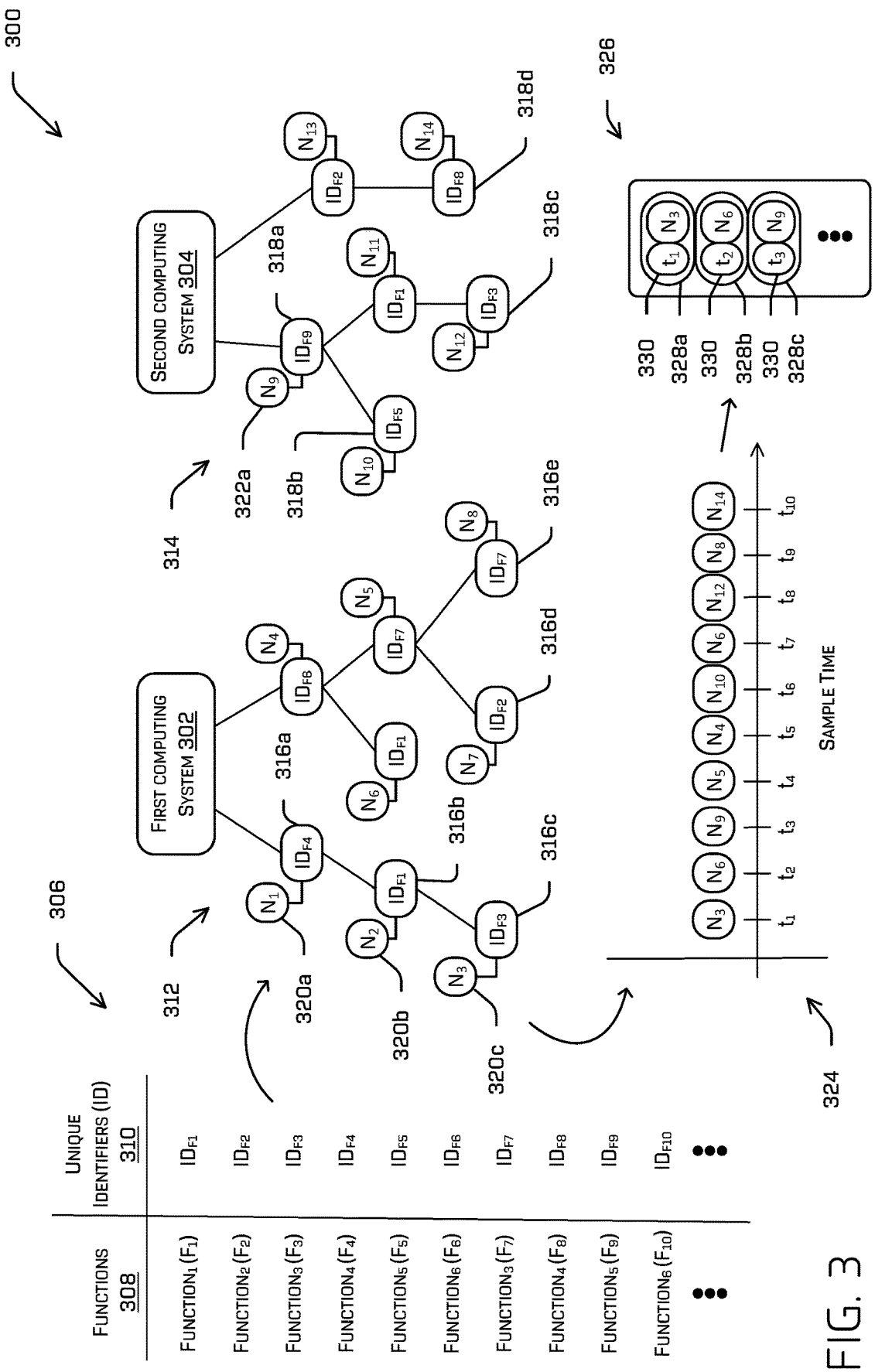
FIG. 3 illustrates an example scenario for identifying and tracking stack functions in multiple systems of the autonomous vehicle, as described herein.
Figure 4A:
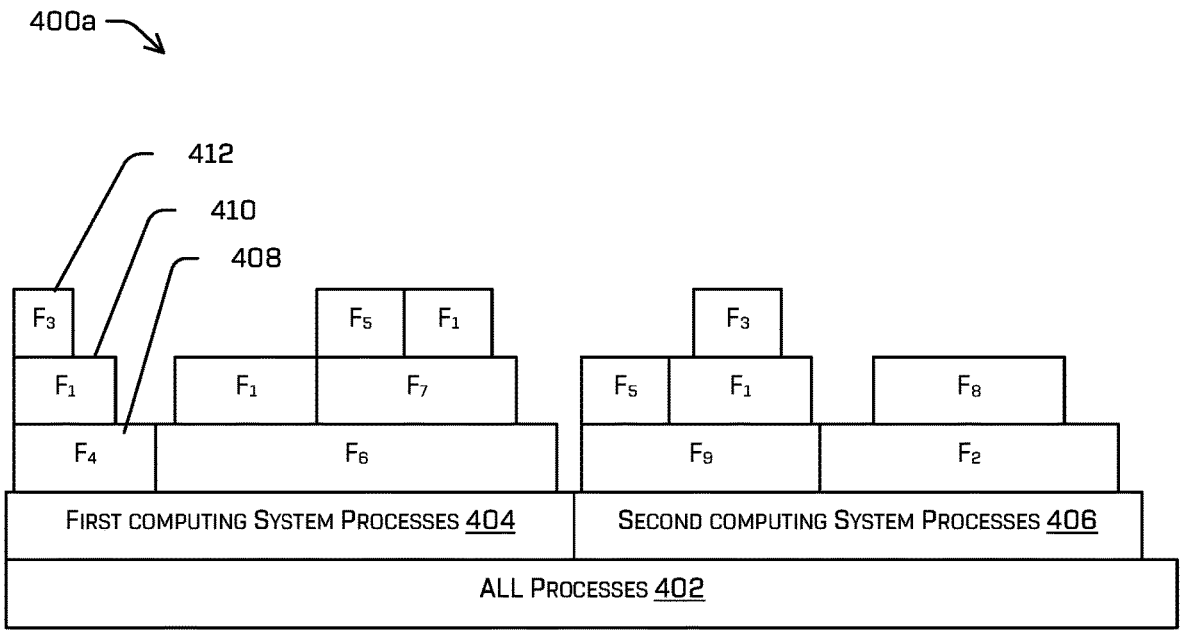
FIGS. 4A and 4B illustrate example graphs including, respectively, a flame graph showing CPU usage for functions across two related systems and a distribution of measured CPU usage, as described herein.
Figure 4B:
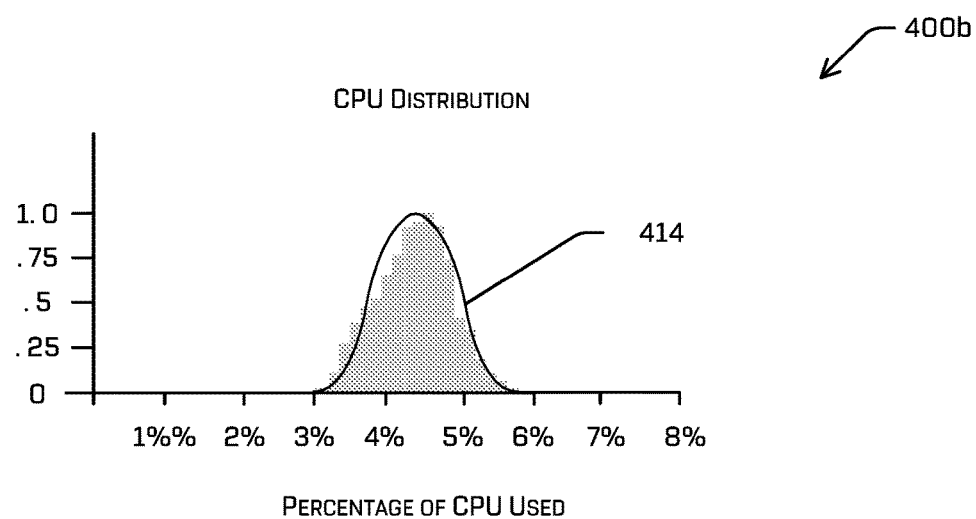

FIG. 3 is a schematic 300 that illustrates techniques of this disclosure directed toward determining CPU usage associated with one or more systems in a computing environment. More specifically, FIG. 3 is an example of how CPU usage can be determined for a first computing system 302 and a second computing system 304. In some examples, the first computing system 302 may correspond to one of the computing systems 110, 112, 114 and the second computing system 304 may correspond to another of the computing systems 110, 112, 114, although such is not required. For instance, the first computing system 302 and the second computing system 304 can be any system, including but not limited to the sensor systems 104, the computing systems 110, 112, 114, and/or any other system. In implementations described herein, the first computing system 302 may be configured to perform a number of processes and/or functions and the second computing system 304 may also be configured to perform a number of processes and/or functions. For example, each of the first computing system 302 and the second computing system 304 may include instructions for performing different operations executable by one or more processors, which operations may include one or processes, each including one or more functions. Although the first computing system 302 and the second computing system 304 are separate systems, in implementations described herein, they may be subsystems of a larger system, e.g., the vehicle 102. Thus, while the first computing system 302 and the second computing system 304 may be configured to receive different data and generate and output other data, the two systems 302, 304 may have overlapping functions. Stated differently, certain functions and/or processes may be called to execute functionality associated with either or both of the first computing system 302 and the second computing system 304. As described further herein, techniques of this disclosure can determine how much of a process, function, or the like was on CPU, proportional to other processes, functions, etc. using the CPU, for discrete segments of time.

FIG. 3 also includes a symbol table 306 used in example implementations to determine CPU usage. More specifically, the symbol table 306 associates each discrete function 308 in the computing environment, e.g., each function used by either or both of the first computing system 302 and/or the second computing system 304 in the example of FIG. 3, with a unique identifier 310. In some implementations, each of the functions may represent a stack frame in a stack e.g., a software stack. The symbol table 306 may be generated during functioning of the first computing system 302 and the second computing system 304, e.g., by adding each function, as it is called, to the symbol table 306 and associating the ID 310. In the example of the vehicle 102, while many complex functions are being performed and large amounts of data are being received, generated, processed, and output, the majority of the computing systems, including the first computing system 302 and the second computing system 304 are continuously re-running the same processes and functions. Thus, for example, the symbol table 306 may quickly stabilize with relatively few additions within a relatively small amount of time. Stated differently, in some examples of the vehicle 102, every computing function of the vehicle 102 may have been executed on the order of seconds.

Techniques described herein can also generate one or more data structures organizing the functions 308. For example, FIG. 3 illustrates an organization of stack traces including the functions as one or more data structures. More specifically, FIG. 3 includes a visualization of a first prefix tree 312 and a visualization of a second prefix tree 314. The first prefix tree 312 illustrates all stack functions associated with the first computing system 302 and the second prefix tree 314 illustrates all stack functions associated with the second computing system 304. In the first prefix tree 312, functions are illustrated as first nodes 316 (some of which are individually labelled as first nodes 316a, 316b, and so forth) and in the second prefix tree 314, functions are illustrated as second nodes 318 (some of which are individually labelled as second nodes 318a, 318b, and so forth). Each of the first nodes 316 and the second nodes 318 are illustrated as including the function ID 310 from the symbol table 306. As also illustrated, the first prefix tree 312 includes a unique node identifier associated with each of the first nodes 318. Thus, for example, a unique node identifier ($N_1$) 320a is associated with the first node 316a, a unique node identifier ($N_2$) 320b is associated with the first node 316b, and so forth. Herein two or more of the unique node identifiers in the first prefix tree 312 may be referred to as the unique node identifiers 320. Reference numerals corresponding to some of the nodes 316 and the unique node identifiers 320 are omitted for clarity. The second prefix tree 314 similarly includes second unique node identifiers 322 (one of which is individually referenced as a second unique node identifier 322a, and multiple of which may be collectively referred to as the second unique node identifiers 322) associated with each of the nodes 318.

As shown, then the first prefix tree 312 visualizes all stack traces associated with the first computing system 302, e.g., as branches of the tree. Thus, for example, a first process includes, in order, the function $F_4$ (as illustrated by the first node 316a), followed by the function $F_1$ (as illustrated by the first node 316b), and, finally, the function $F_3$ (as illustrated by the first node 316c). As also illustrated, the first node 316a has an associated first unique node identifier ($N_1$) 320a, the first node 316b has an associated first unique node identifier ($N_2$) 320b, and the first node 316c has an associated first unique node identifier ($N_3$) 320c. The first and second unique node identifiers 320, 322 may include unique identifiers that allow for disambiguation between the same functions in different processes (or stack traces). By way of illustration, the node 316c in the first prefix tree 312 and the node 318c in the second prefix tree 314 both represent the function $F_3$. However, because techniques described herein associate the unique node identifier 320c with the first node 316c and the unique node identifier 322c with the second node 318c, the nodes 316c, 318c, as well as the stack traces of which they are associated, are distinguishable, despite representing the exact same function ($F_3$).

More specifically, in examples described herein, processing associated with the first computing system 302 and the second computing system 304 can be characterized by CPU usage. For example, FIG. 3 also includes a timeline 324 illustrating sampling of the CPU. Sampling may include periodically determining, e.g., at time intervals $t_1$, $t_2$, etc., a node, e.g., designated by the unique node identifier 320, 322, associated with an on-CPU function being executed. Because each node is unique, it is possible to re-create the stack of which the read-out node is a part. The read-out nodes can be aggregated over a time period to provide an indication of which functions were on-CPU, relative to other functions, for the time period.

In some examples, such data structures (e.g., the prefix trees 312, 314) can be determined at run time. In such examples, queries can be performed on the one or more processors to determine one or more of stack traces or currently running functions at a particular time. Results of such queries may be used to build such a tree. In some such examples, the different function calls may be predominantly the same after several seconds such that no new nodes are generated after such a time period. In some examples, such data structures may be precomputed (e.g., either on-vehicle or off vehicle) to be used for later logging.

As also described herein, the techniques can associate a time, e.g., the sampling time, with each function being called. In implementations described herein, for example, a timestamp may be associated with each of the nodes 320, 322 and the timeline 324 provides a visualization of the calling of each of the functions with the associated time of the timestamps. Of course, the timeline 324 is illustrated for example purposes only. In some example implementations, the first computing system 302 and/or the second computing system 304 may perform associated functions at a relatively high frequency. For example, the first computing system 302 and/or the second computing system 304 may be configured to generate data, e.g., by running one or more of the illustrated stack traces, on the order of microseconds, milliseconds, or faster. Thus, the illustrated timeline 324 may be on the order of milliseconds and the data can be aggregated over a much longer period of time, e.g., seconds, minutes, hours, a lifetime of the vehicle, or the like. Moreover, because timestamps are associated with each of the functions, specific points in time may be considered.

In some examples, the read-out nodes and timestamps can be stored such as shown in the illustration 326. More specifically, the illustration 326 includes packets 328a, 328b, 328c storing the unique node identifiers 320, 322 in association with timestamps 330 signifying the sample times at which the identifiers are read out. Thus, according to examples of this disclosure, all operations of the first computing system 302 and the second computing system 304 are determinable using only the packets 328. In at least some examples, for example those which sample running processes with a regular interval, such packets 328 may solely comprise the node IDs 320, 322. Accordingly, the techniques described herein reduce the computation time of the vehicle by storing the CPU usage as a series of data packets, which data packets may include only a timestamp and/or a node ID. The generation and storing of these packets allow for ready interpretation and manipulation of CPU usage data for the systems. For example, the timestamps allow for investigation of the processes at certain points in time. This may be distinct from conventional techniques for quantifying or otherwise interpreting CPU usage, which may require running CPU usage.

FIGS. 4A and 4B show visualizations of CPU usage determined using the techniques described and illustrated in FIG. 3. More specifically, FIG. 4 shows a graph 400a, which is a visualization of CPU usage of the processes associated with each of the first computing system 302 and the second computing system 304 in FIG. 3. For example, the graph may be a flame graph. In the graph 400a, each box represents a function, e.g., one of the functions 308, in a stack, with stacks being built up along the y-axis according to related functioning, e.g., according to the processes demonstrated in the prefix trees 312, 314 in FIG. 3. Thus, for example, the lowermost box 402 represents all processes, e.g., all processes on the vehicle 102. The two boxes 404, 406 directly above (e.g., on) the box 402 represent, respectively, all functions associated with the first computing system 302 and the box 404 represents, respectively, all functions associated with the second computing system 304. Further describing the graph 400a, boxes 408, 410, 412 are illustrated as stacked on the box 404. The boxes 408, 410, 412 illustrate, respectively, function $F_4$, function $F_1$, and function $F_3$. As will be appreciated, the boxes 408, 410, 412, illustrate the stack trace having the nodes $N_1$, $N_2$, $N_3$, shown in FIG. 3. Thus, as will also be appreciated, vertical portions of the graph 400a represent the same stack traces as the trees 312, 314. However, unlike the prefix trees 312, 314, the graph 400a illustrates CPU usage for each function, over some period of time, relative to other functions.

As discussed above with reference to FIG. 3, periodic sampling of computing operations according to techniques described herein provides an identification of a unique node ID associated with the process being executed at a discrete sampling time. The graph 200a can be created based on an aggregation of these unique node IDs. For example, each unique node ID is associated with some process that was on-CPU. Consider a simple example in which a system performs only two functions, A and B. If, during sampling, function A is readout twice as frequently as function B, in a graph like the graph 400a the width of the box associated with function A would be twice as wide as that of function B, which would indicate that function A is using roughly 66% of CPU usage and function B is using roughly 33% of CPU usage. That is, the graph shows relative CPU usage, with the widest box representing 100% of CPU usage. Accordingly, the graph 400a of FIG. 4A shows that sampling returned roughly as many unique node IDs associated with first system processes as unique node IDs associated with second system processes (because the box 404 is roughly the same width as the box 406). Therefore, each of system A and system B was responsible for roughly 50% of CPU usage. The widths of the boxes above the boxes 404, 406, then, correspond to how many times the upper-most horizontal line at any position on the X-axis was read-out. To provide an example, as noted above, the box 408 corresponds to the node ($N_3$) 320c, the box 410 corresponds to the node ($N_2$) 320b, and the box 412 corresponds to the node ($N_1$) 320a. Thus, in the time window represented by the graph 400a, nodes 320a, 320b, 320c may have been sampled roughly the same number of times. However, because the node ($N_3$) 320c is in the stack trace after the function represented by the node ($N_2$) 320b and after the function represented by the node ($N_1$) 320a, a visualization of the reading out of the node ($N_3$) 320c includes the stack from which it depends. Accordingly, leaf nodes are illustrated higher than any branch nodes from which they depend in FIG. 4A. As will be appreciated, taking different time windows may result in different CPU usage statistics, and thus vary the graph 400a.

In examples described herein, the CPU usage for each of the functions may be determined by sampling at a fixed rate. While any sampling rate may be used, it may be desirable to use a sampling rate that is other than a common frequency used by systems of the vehicle, e.g., the first computing system 302 and the second computing system 304. Thus, for example, in some implementations, a sampling frequency of 97 Hz may be used. As will be appreciated, sampling of the CPU while the first system 302 and the second system 304 are operating, the CPU usage for each of the processes can be approximated. Further, since the logged data (e.g. illustration 326) may comprise small amounts of data over long periods of time, compute (e.g., CPU) usage may be determined after data recording for any selected window of time and statistical analysis may be performed with respect to CPU usage for a given window of time as applied over the entirety of the data.

In some examples, the graph 400a may be used to understand which systems, processes, and/or functions most heavily taxing the CPU. Moreover, because the techniques described herein associate timestamps with each of the functions, specific windows of time can be investigated. For instance, when the diagnostics system 132 determines an anomalous latency event, a flame graph like the graph 400a can be generated for a time proximate the latency event. In this manner, technicians may more readily identify a source of the latency issue.

In other examples, the CPU distribution information may be used to further enhance safety on the vehicle 102. For example, FIG. 4B illustrates a distribution of CPU usage for one or more systems of the vehicle. For example, the CPU distribution of 400b may show a percentage of use for the first computing system 302 relative to all systems on the vehicle 102. By way of non-limiting example, in some instances, the CPU usages illustrated in 400b can be CPU usages determined for a number of discrete time periods, e.g., 2-3 second time periods. Then, by plotting these discrete CPU usages of the system over some amount of time, e.g., an overall runtime of the vehicle 102, an expected CPU usage threshold or range can be determined. For instance, in the example of FIG. 4B, the distribution 414 illustrated in the graph 400b illustrates that over 99% of the time, the illustrated system uses between about 3% to about 6% of the CPU. Accordingly, as with the distribution illustrated in FIG. 2B, FIG. 4B may be used to provide thresholds within which the system is expected to operate (and/or other statistical information used for comparison with a nominal operating condition). During operation, if it is determined that the system is operating outside of this range, e.g., if a CPU usage calculated in real-time or near-real time is outside the range, a CPU usage event may be determined. In some examples, the CPU usage event may be handled the same as an anomalous latency event, as described above in connection with FIG. 1. Thus, and although not illustrated, the diagnostics system 132 may include a CPU usage determination component similar to the latency determination component 134 and/or a CPU usage threshold component similar to the latency threshold component 136. In these examples, the safe state component 138 may consider information about both the latency, as discussed above in connection FIG. 1, and the CPU usage as just described.

As also noted above, the latency-related techniques described herein may be used in conjunction with the CPU usage-related techniques. For example, when an anomalous latency event is determined, e.g., by the diagnostics system 132, the timestamps 124 may be used to determine a time of the latency event, and the unique identifiers 126 may be used to determine a source of the anomalous latency event. Thus, for example, the latency-related techniques described herein may identify the anomalous event and pinpoint a location of the event. With this information, a flame graph or other CPU usage information may be generated for the fingered system at and around the identified time. In this manner, to the extent the latency is attributable to some process executed by the system, the process can be identified readily. In other examples, as described above, the CPU usage may be used independently to identify an anomalous event, e.g., when a system is operating outside of a normal or expected operating range. In at least some examples, such an event may be associated with a single occurrence of a system, subsystem, process, or the like being outside of a threshold CPU usage range. In other examples, the event may be associated with a statistical aggregation of data that determines CPU usage, e.g., over some time, to be outside of an expected range or threshold.

Moreover, the CPU usage determination techniques described herein can be used for other diagnostic and/or system design purposes. For instance, and similar to techniques described above with reference to FIGS. 1, 2A and 2B, CPU usage can be used to understand system modifications. For example, new software versions and/or replacement components can have varying impact on CPU usage, and the techniques described herein for determining CPU usage may allow for statistical analysis of these system changes. For instance, the distribution 414 shown in FIG. 4B may be for one example system, running one software version. In some examples, a similar distribution may be determined for the same system running a different version of the software. Differences in impact on the CPU-usage may be apparent from the distributions. In some examples, a version for implementation on the vehicle may be determined based on the comparison. In some examples, the version having the lowest mean CPU usage, the least variance, or the like may be selected.

Figure 5:
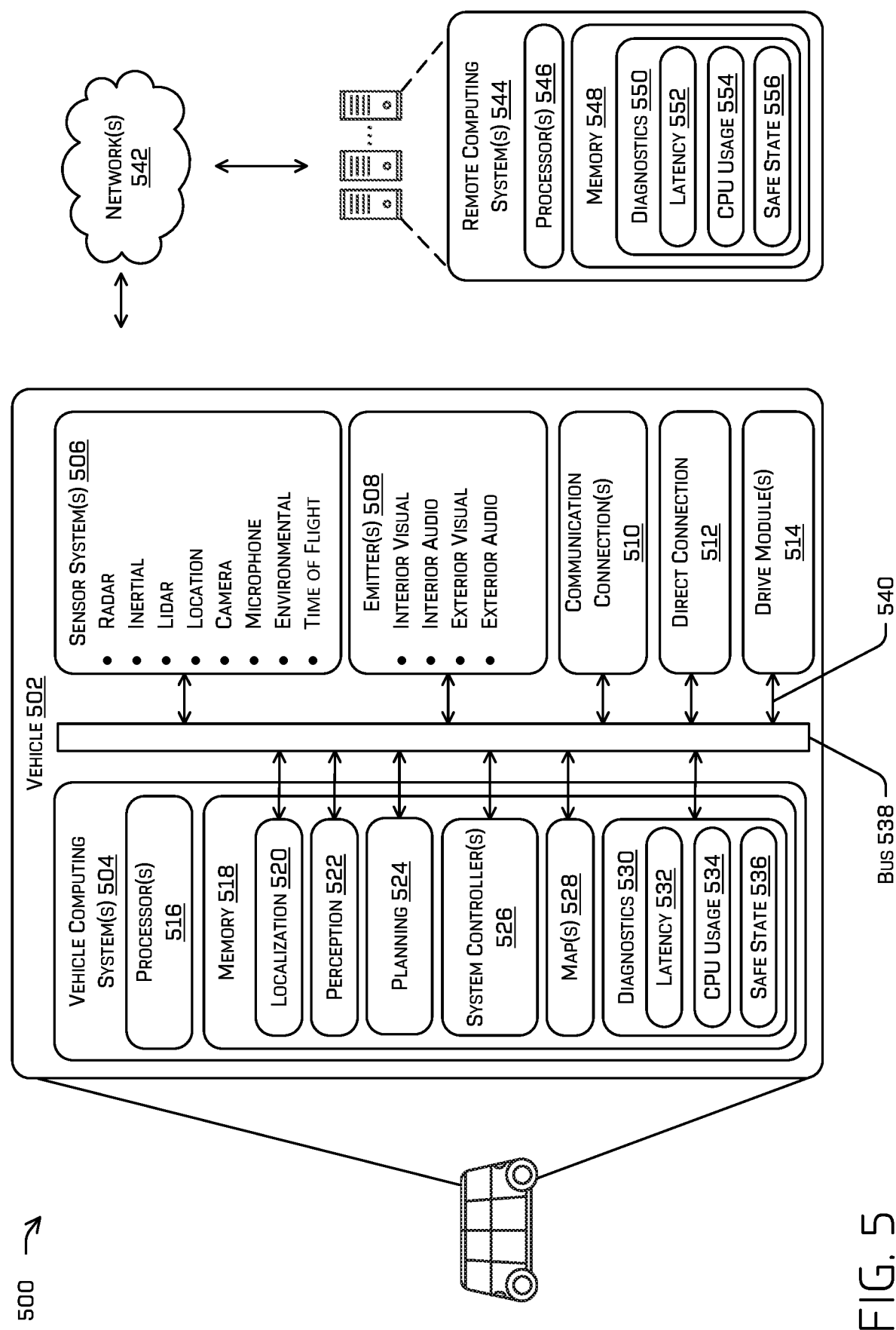
FIG. 5 depicts a block diagram of an example architecture for implementing latency and CPU usage techniques, as described herein.

FIG. 5 depicts a block diagram of an example architecture 500 for implementing the techniques discussed herein. In at least one example, the architecture 500 can include a vehicle 502, which can be similar to (or the same as) the vehicle 102 described above with reference to FIG. 1. In the illustrated architecture 500, the vehicle 502 is an autonomous vehicle; however, the vehicle 502 can be any other type of vehicle.

The vehicle 502 can include one or more vehicle computing systems 504, one or more sensor systems 506, one or more emitters 508, one or more communication connections 510, at least one direct connection 512 (e.g., for physically coupling with the vehicle 502 to exchange data and/or to provide power), and one or more drive modules 514. In some instances, the vehicle 502 can include additional instances of the vehicle computing system(s) 504.

The vehicle computing system(s) 504 can include one or more processors 516 and memory 518 communicatively coupled with the one or more processor(s) 516. In the illustrated example, the memory 518 of the vehicle computing system(s) 504 stores a localization system 520, a perception system 522, a planning system 524, one or more system controller(s) 526, one or more maps 528, and a diagnostics system 530. In examples, the diagnostics system 530 may be the same as or include functionality similar to that of the diagnostics system 132 described above. Though depicted as residing in the memory 518 for illustrative purposes, it is contemplated that the localization system 520, the perception system 522, the planning system 524, the one or more system controllers 526, the map(s) 528, and/or the diagnostics system 530 can additionally, or alternatively, be accessible to the computing system(s) 504 (e.g., stored in a different component of vehicle 502 and/or be accessible to the vehicle 502 (e.g., stored remotely)). Moreover, although certain features and functionality may be ascribed to various systems and components, such is for example only. The features and functions may be associated with and/or performed by other or additional components. Moreover, some functionality ascribed to a specific system or component may be distributed across multiple systems/components.

In at least one example, the localization system 520 can include functionality to receive data from the sensor system(s) 506 to determine a position of the vehicle 502. In some implementations, the localization system 520 can include and/or request/receive a three-dimensional map, e.g., of the map(s) 528, of an environment and can continuously determine a location of the autonomous vehicle within the map. In some instances, the localization system 520 can use SLAM (simultaneous localization and mapping) or CLAMS (calibration, localization and mapping, simultaneously) to receive image data, such as from the time-of-flight sensor, LIDAR data, RADAR data, SONAR data, IMU data, GPS data, wheel encoder data, or any combination thereof, and the like to accurately determine a location of the autonomous vehicle 502. In some instances, the localization system 520 can provide data, e.g., by publishing data according to techniques described herein, to various components of the vehicle 502 to determine an initial position of an autonomous vehicle for generating a candidate trajectory, as discussed herein.

In some examples, the perception system 522 can include functionality to perform object detection, segmentation, and/or classification. For instance, the perception system 522 can provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In additional and/or alternative examples, the perception system 522 can provide, e.g., by publishing, processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some instances, the planning system 524 can determine a path for the vehicle 502 to follow to traverse through an environment. For example, the planning system 524 can determine various routes and trajectories and various levels of detail. For example, the planning system 524 can determine a route to travel from a first location (e.g., a current location) to a second location (e.g., a target location). For the purpose of this discussion, a route can be a sequence of waypoints for traveling between two locations. As non-limiting examples, waypoints can include streets, intersections, global positioning system (GPS) coordinates, etc. Further, the planning system 524 can generate an instruction for guiding the autonomous vehicle along at least a portion of the route from the first location to the second location. In at least one example, the planning system 524 can determine how to guide the autonomous vehicle 502 from a first waypoint in the sequence of waypoints to a second waypoint in the sequence of waypoints. In some examples, the instruction can be a trajectory, or a portion of a trajectory. In some examples, multiple trajectories can be substantially simultaneously generated (i.e., within technical tolerances) in accordance with a receding horizon technique. A single trajectory of the multiple trajectories in a receding horizon having the highest confidence level may be selected to operate the vehicle.

In other examples, the planning system 524 can alternatively, or additionally, use data from the perception system 522, e.g., received via subscription, to determine a path for the vehicle 502 to follow to traverse through an environment. For example, the planning system 524 can receive data from the perception system 522 regarding objects associated with an environment. Using this data, the planning system 524 can determine a route to travel from a first location (e.g., a current location) to a second location (e.g., a target location) to avoid these objects in the environment.

In at least one example, the vehicle computing system(s) 504 can include one or more system controller(s) 526, which can be configured to control steering, propulsion, braking, safety, emitters, communication, and other systems of the vehicle 502. The system controller(s) 526 can communicate with and/or control corresponding systems of the drive module(s) 516 and/or other components of the vehicle 502, which may be configured to operate in accordance with a trajectory provided from the planning system 524. In techniques described herein, the system controller(s) 526 can subscribe to receive information about a trajectory along which the vehicle 502 can travel, e.g., published by the planning system 524.

Although not required, in some instances, the localization system 520, the perception system 522, the planning system 524, and the system controller(s) 526 can act serially. For instance, the localization system 520 can receive data, e.g., sensor data, and, using the sensor data, generate and output localization system data. The localization system data then can be received at the perception system 522, which can use the localization system data to generate perception system data. The perception system data may then be received at the planning system 524, which may use the perception system data to generate planning system data, and so forth. However, in other instances, data may be received at (and used by) multiple different systems for performing many different functions.

In some examples, the map(s) 528 can be stored on a remote computing device. In some examples, the map(s) 528 can be stored based on a characteristic (e.g., type of entity, time of day, day of week, season of the year, etc.). Storing multiple of the map(s) 528 can have similar memory requirements, but increase the speed at which data in a map can be accessed. In at least some examples the map(s) 528 and/or information related to the map(s) 528 can be published in accordance with implementations described herein. For instance, the vehicle computing system(s) 504 or some other system can publish information about a network of roads at least partly informed by the map(s) 528.

The diagnostics system 530 can be configured to determine parameters for safe operation of the vehicle 502, to ensure that the vehicle 502 is operating within the safe parameters, and/or to control the vehicle when the vehicle is not operating within the safe parameters. As illustrated, the diagnostics system 530 can include a latency component 532, a CPU usage component 534, and a safe state component 536. Although the diagnostics system 530 is illustrated as a single block in the memory 518, a separate diagnostics system 530 can be included in or accessible to individual of the systems and/or components. By way of non-limiting example, the localization system 520 may have its own associated safe state component, independent of the safe state component 536 and/or any other safe state components. For example, the safe state component of the diagnostics system 530 may configure the vehicle to execute a safe stop or take some safety-related action in response to an anomalous performance event at the localization system 520. Similarly, the anomalous event may be determined by a latency component 532 and/or a CPU usage component associated only with the localization system 520.

In some implementations, the latency component 532 can perform functions associated with system latency. For example, the latency component 532 can receive information associated with the receipt, creation, and/or output of data from one or more of the systems associated with the vehicle 502. In some examples, the latency component 532 can receive tag information, such as information associated with the tags 122. Using this information, the latency component 532 can calculate latencies associated with one or more of the systems. For example, the latency component 532 can determine a vehicle-wide latency, e.g., by tracking how long it takes for data generated by one of the sensors or some other data input to propagate through the various systems and eventually be used to control the vehicle 502. In other examples, the latency component 532 can be used to determine latency for a specific subset of all systems (or of a single system) on the vehicle 502. For example, because the tags 122 accumulate the unique identifiers 126, the latency component 532 can generate latency for any system or systems by tracking one or more specific data instances. Moreover, because the tags 122 can also include the timestamp information 124, the latency component 532 can also determine that latency for any window of time. The latency component 532, in some examples, can perform statistical aggregations of latency over a period of time (e.g. a window of time, such as 2 seconds) in order to determine statistical information about the components.

The latency component 532 can also compare determined latencies (or statistical attributes of aggregated information) to latency thresholds or latency ranges to determine whether the vehicle 502 or some system of the vehicle 502 is functioning properly. By way of nonlimiting example, each system on the vehicle 502, e.g., the localization system 520, the perception system 522, each of the sensor system(s) 506, or the like, may have a different acceptable range of latencies i.e. equal to or above a first threshold latency and/or equal to or below a second (e.g., higher) threshold latency. In some examples, calculations may comprise comparing a latency with a min, max, mean, variance/standard deviation, etc of previously collected nominal operating behavior. In implementations described herein, the latency component 532 can compare a latency determined for a given system to the acceptable latency range of that system. When the calculated latency is within the acceptable range, the vehicle may be deemed to be functioning as expected. However, when the calculated latency is outside the acceptable latency range, the latency component 532 may identify an anomalous latency event. In some examples, information about the anomalous latency event may be provided to the safe state component 536 to take some safe action. The safe state component 536 is described in more detail below.

The latency component 532 may also be configured to determine the acceptable latency ranges. For example, the latency component 532 may receive data over an extended runtime of a specific system or systems, such as illustrated in FIG. 2A. Using such data, the latency determination component can determine a distribution function associated with the received data, generally as illustrated in FIG. 2B. The distribution function can characterize a history of latency associated with the system, and this history can inform a safe operating latency range for the system. For instance, the range may be a range that includes some percentage, e.g. 95% or 100%, of all determined latencies.

The CPU usage component 534 of the diagnostics system 530 can include functionality related to CPU usage of system(s) of the vehicle 502. For example, the CPU usage component 534 can quantify CPU usage on a system-by-system, process-by-process, and/or a function-by-function basis to determine when systems/processes/functions are operating outside of an acceptable operating range. For instance, the CPU usage component 534 can generate functions to perform the acts generally described in connection with the scheme 300 illustrated in FIG. 3. In some instances, the CPU usage component 534 can generate a data structure of all processes and/or functions run by the vehicle 502 and/or one or more systems of the vehicle 502. For instance, the CPU usage component 534 can include functionality to review a log of processes associated with one or more of the systems of the vehicle 502 and generate a structure representing the processes, e.g. stack traces. An example of the vehicle 502, each of the systems generally perform as many of the same processes repeatedly. For instance, the localization system 520 may periodically receive sensor data and process the sensor data to generate and output data about a position of the vehicle in the environment. While this example greatly simplifies processing associated with the localization system 520, the localization system 520 does have a discrete number of processes and functions which it undertakes with sufficient regularity that by merely tracking a log associated with the functioning of the localization system 524 a relatively short period of time, e.g. on the order of seconds, a complete stack trace or stack traces for all of the processes and functions undertaken by the localization system 520 may be substantially compiled.

As also discussed above in connection with, and as illustrated in, FIG. 3, the CPU usage component 534 may characterize the data structure associated with the processes and/or functions as a tree graph including a plurality of nodes. Each of the nodes may have an associated feature ID, which may be a unique ID, such as an integer, representative of one of the functions. Accordingly, and as discussed above, several of the nodes may have the same function ID, e.g., because some functions may be performed in multiple processes throughout a system or across systems. Accordingly, to differentiate between the same function in different processes, the CPU usage component 534 can also generate a unique node ID for each node in the tree graph.

The CPU usage component 534 can also sample operations on the CPU by determining a function running on the CPU at discrete times. In some examples, the CPU usage component 534 may sample at a rate of between about 95 Hz and about 100 Hz, exclusive (e.g., to differentiate from standard frequencies associated with systems of the vehicle), although other frequencies may be used. As a result of the sampling, the CPU usage component 534 may generate, for each sample, a data packet comprising the node ID identifying the on-CPU function, as well as a timestamp associated with the time at which the sample was obtained.

In some implementations, the CPU usage component 534 can use the information obtained by sampling to generate a CPU usage history for the vehicle. For example, the CPU usage history may be visualized as a graph, such as the graph 400a illustrated in FIG. 4. For example, the graph can be a useful tool for identifying CPU usage for systems, processes and functions relative to an overall usage of the CPU. Moreover, and because techniques described herein generate packets associating the executed function, e.g., identified by the unique node ID, with a timestamp, the CPU usage component 534 can also determine CPU usage for specific times or ranges of time. By way of nonlimiting example, when a system is suspected of improper functioning, the CPU usage component 534 can generate CPU usage information for that specific system. Similarly, when improper functioning is suspected at a specific time, the CPU usage component 534 can determine CPU usage for a time period that includes the specific time, e.g., by retrieving the packets having timestamps corresponding to the time period and building the stack traces from the associated node IDs.

In additional implementations, the CPU usage component 534 can compare determined CPU usages to CPU usage thresholds or CPU usage ranges to determine whether the vehicle 502 or some system of the vehicle 502 is functioning properly. By way of nonlimiting example, each system on the vehicle 502, e.g., the localization system 520, the perception system 522, each of the sensor system(s) 506, and/or the like, may have a different acceptable range of CPU usage. Stated differently, each of the systems may have to share CPU usage and thus each system may be expected to use the CPU in an amount that is equal to or above a first threshold usage and/or equal to or below a second (e.g., higher) threshold use. As will be appreciated, the thresholds may vary from system to system. Moreover, the ranges and/or expected CPU usages may be dynamic. For instance, because the systems described herein can include many interrelated subsystems, overall CPU usage of the entire system may be more important than CPU usage of any subsystem. Thus, for example, an acceptable CPU usage for multiple (or all) subsystems can be determined in some examples. Accordingly, for example, for a given time period some systems may have relatively higher acceptable CPU usage, so long as other systems are performing less computing.

In implementations described herein, the CPU usage component 534 can compare a CPU usage determined for a given system (or subsystem or process or function) to the acceptable CPU usage range associated with that system (or subsystem or process or function). When the calculated CPU usage is within the acceptable range, the vehicle (or system or process or function) may be deemed to be functioning as expected. However, when the calculated CPU usage is outside the acceptable CPU usage range, the CPU usage component 534 may identify an anomalous CPU usage event. In some examples, information about the anomalous CPU usage event may be provided to the safe state component 536, which may control the vehicle 502 to take some safe action. The safe state component 536 is described in more detail below The CPU usage component 534 may also be configured to determine the acceptable CPU usage ranges. For example, the CPU usage component 534 may receive data over an extended runtime of a specific system or systems, and, using such data, the CPU usage component 534 can determine a distribution function associated with the received data, generally as illustrated in FIG. 4B. In at least some examples, the distribution function may be determined as statistical averages of CPU usage for a window of time as determined repeatedly for the entirety of the log. The distribution function can characterize a history of CPU usage associated with the system(s), and this history can inform a safe operating CPU usage range for the system(s). For instance, the range may be a range that includes some percentage, e.g. 95% or 100%, of all determined CPU usage measurements. In FIG. 4B, the range may be from about 4.0% to about 7.0% of all CPU usage on the vehicle 502, for example.

The safe state component 536 can determine and output one or more actions in response to the latency component 532 and/or the CPU usage component 534 generating a determining occurrence of an event. For example, the safe state component 536 may initiate a safe stop of the vehicle. In some implementations, the planning system 524 may generate a safe trajectory as a fallback trajectory, e.g., in addition to one or more normal driving trajectories. Thus, when the latency component 532 detects that a latency of one or more systems is outside of an expected or safe operating range and/or the CPU usage component 534 determines that a system (or process or function) is using an amount of the CPU that is outside an expected or a safe operating CPU usage range, the safe state component 536 can cause the vehicle to execute this safe stop trajectory. In other implementations, the safe state component 536 can execute a strategy that disables certain functions of the vehicle 502, e.g., to prevent the vehicle from moving once brought to stop.

In some examples, the safe state component 536 can determine actions different from those causing the vehicle to come to a stop. For example, the safe state component 536 can undertake one or more mitigation strategies to mitigate the detected event. In some examples such mitigation strategies can include creating an alert to a passenger, to a remote operator, or other entity. For example, the alert may request assistance from the entity. In other implementations, the safe state component 536 can take actions to reconfigure systems and/or settings of the vehicle 502. For example, the safe state component 536 may prevent certain data from being received and/or published, e.g., in an attempt to reduce network traffic, thereby reducing latency. For example, excessive network traffic may be a common cause of excessive latency. Other mitigation strategies may include reducing the speed of the vehicle. For example, because the thresholds associated with or latency and/or CPU usage may be safety-related, the vehicle may be able to maintain safe operation with higher latency at slower speeds. Thus, for example, the periodicity at which critical data is to be received may be extended when the vehicle is moving more slowly and/or a greater latency may be tolerable. Similarly, an acceptable latency may be longer when the vehicle is travelling more slowly.

Although the foregoing examples illustrate generating latency data and/or CPU usage data for purposes of ensuring safe control of the vehicle while the vehicle is in operation, other example use cases also are contemplated. For example, the techniques described herein for generating latency data and/or CPU usage data may also be used to compare functionality of different vehicle and/or different software versions. In some examples, by generating frequency distribution data (for latency and/or for CPU usage data) for multiple software versions using the techniques descried herein, the diagnostics system 530 can readily determine how the updated software affects the system. Thus, the diagnostics system 530 and functionality associated therewith may serve as a valuable tool not just for safe operation of the vehicle, but for testing and system design.

In at least one example, the sensor system(s) 506 can include time-of-flight sensors, location sensors (e.g., GPS, compass, etc.), inertial sensors (e.g., inertial measurement units (IMUs), accelerometers, magnetometers, gyroscopes, etc.), LIDAR sensors, RADAR sensors, SONAR sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 506 can include multiple instances of each of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the computing system(s) 504, e.g., by publishing sensor data in accordance with examples described herein.

The vehicle 502 can also include one or more emitter(s) 508 for emitting light and/or sound, as described above. The emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 can also include the one or more communication connection(s) 510, which may enable communication between the vehicle 502 and one or more other local or remote computing device(s). For instance, the communication connection(s) 510 can facilitate communication with other local computing device(s) on the vehicle 502 and/or the drive module(s) 514. Also, the communication connection(s) 510 can allow the vehicle to communicate with other nearby computing device(s) (e.g., other nearby vehicles, traffic signals, etc.). The communications connection(s) 510 can also enable the vehicle 502 to communicate with a remote teleoperations computing device or other remote services.

The communications connection(s) 510 can include physical and/or logical interfaces for connecting the computing system(s) 504 to another computing device or a network (e.g., the Internet), such as a network 542. For example, the communication connection(s) 510 can enable Wi-Fi-based communication such as via frequencies defined by the IEEE 802.11 standards, short range wireless frequencies such as Bluetooth, cellular communication (e.g., 2G, 5G, 4G, 4G LTE, 5G, etc.) or any suitable wired or wireless communications protocol that enables the respective computing device to interface with the other computing device(s).

As noted above, the direct connection 512 can physically couple devices to the vehicle 502, e.g., to exchange data and/or to provide power. In some examples, the direct connection 512 may provide a point of access to one or more client computing systems, for example.

The vehicle 502 can also include the drive module(s) 514. In some examples, the vehicle 502 can have a single drive module 514. In at least one example, if the vehicle 502 has multiple drive modules 514, individual drive modules 514 can be positioned on opposite ends of the vehicle 502 (e.g., the front and the rear, etc.). In at least one example, the drive module(s) 514 can include one or more sensor systems to detect conditions of the drive module(s) 514 and/or the surroundings of the vehicle 502. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders can be unique to the drive module(s) 514. In some cases, the sensor system(s) on the drive module(s) 514 can overlap or supplement corresponding systems of the vehicle 502 (e.g., the sensor system(s) 506).

The drive module(s) 514 can include many additional vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 514 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 514. Furthermore, the drive module(s) 514 also include one or more communication connection(s) that enable communication by the respective drive module with one or more other local or remote computing device(s).

As also illustrated in FIG. 5, the vehicle 502 can also include a bus 538 via which each of the components and systems of the vehicle 502 may communicate information. The bus 538 may generally represent a component via which the components send and/or receive data. In at least one example, publishers can publish information to and/or subscribers can receive information via the bus 538. The bus 538 can be any communication network or platform over which data and information can be sent between systems and components of the vehicle 502 using one or more protocols. Arrows 540 in FIG. 5 may show directionality of data relative to the bus 538. Thus, by way of nonlimiting example, the safe state component 536 can publish data, e.g., a safe stop message, to the bus 538, and the drive module(s) 514, which may subscribe to receive safe stop messages, can receive the published message, and implement the safe stop. In another example, the localization system 520 can publish pose information, and the planning system 524 can receive the pose information to determine a trajectory along which the vehicle should be controlled. As will be appreciated, these are only a few very simplistic examples; the various systems and components can publish information to the bus 538 and/or receive information from the bus, e.g. by subscribing to a topic or type of information. Although a publication/subscription scheme, via the bus 538, is illustrated in FIG. 5, other communication architectures may also or alternatively be used.

As noted above, FIG. 5 also illustrates one or more remote computing systems 544. For example, the remote computing system(s) 544 may be one or more computing devices in communication with the vehicle 502, e.g., via the network 542. In other examples, the remote computing system(s) 544 may be directly connected to the vehicle 502, e.g., via the direct connection 512.

The remote computing system(s) 544 can include processor(s) 546 and memory 548 communicatively coupled with the processor(s) 546. In the illustrated example, the memory 548 of the remote computing device(s) 544 stores a diagnostics system 550 including a latency component 552, a CPU usage component 554, and a safe state component 556. In at least one example, the diagnostics system 550 can correspond to at least a portion of the diagnostics component 530, with the latency component 552 corresponding to the latency component 532, the CPU usage component 554 corresponding to the CPU usage component 534, and/or the safe state component 556 corresponding to the safe state component 536. For example, the diagnostics system 550, using the latency component 552 and/or the CPU usage component 554 can determine anomalous events associated with one or systems of the vehicle. In other examples, the remote computing system(s) 544, e.g., using the diagnostics system 550, can receive and/or access the tags 122 and/or the CPU usage packets 328 to determine thresholds and/or expected ranges associated with performance characteristics, such as latency and CPU usage. Making such determinations on a remote computing device may be preferable to on-board. Moreover, the remote computing system(s) 544 may also receive performance data from other vehicles, and data from those other vehicles may be incorporated into statistical analysis on the various systems. Moreover, the safe state component 556 can correspond to at least a portion of the safe state component 536. For example, the safe state component 556 may issue controls to operate the vehicle 502 in a safe mode when an event is detected by one or both of the latency component 552 and/or the CPU usage component 554. The latency component 552 may also perform other diagnostic and/or system planning functions described above with reference to the latency component 532 and the CPU usage component 554 may also perform other diagnostic and/or system planning functions described above with reference to the CPU usage component 534.

The processor(s) 516 of the vehicle 502, and the processor(s) 546 of the remote computing system(s) 544 can be any suitable processor capable of executing instructions to process data and perform operations as described herein. By way of example and not limitation, the processor(s) 516, 546 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 518, 548 may be non-transitory computer-readable media. The memory 518, 548 can store an operating system and one or more software applications, instructions, programs, and/or data to implement the methods described herein and the functions attributed to the various systems. In various implementations, the memory 518, 548 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 518, 548 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can use machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

FIGS. 6-9 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 6:
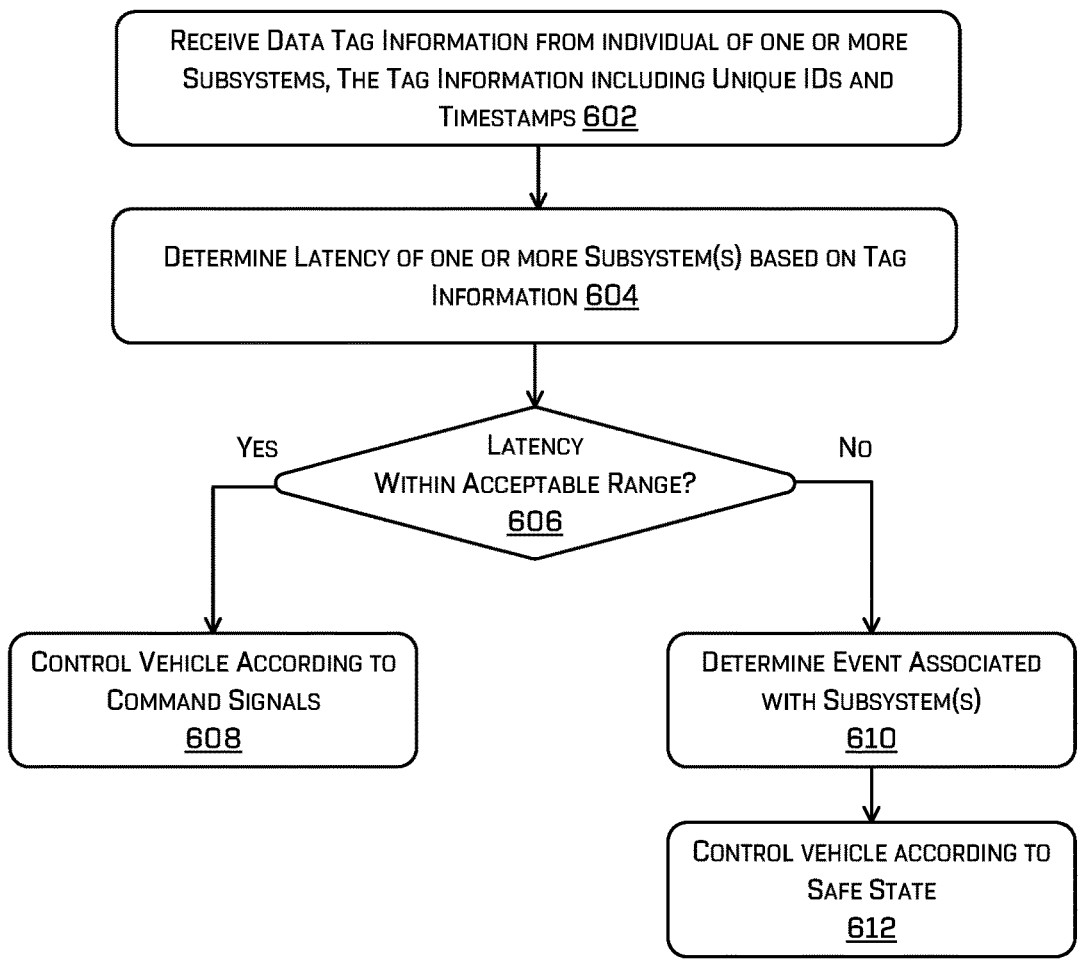
FIG. 6 is a flowchart illustrating an example method for transitioning to a safe stop in response to detecting a latency event, as described herein.

FIG. 6 depicts an example process 600 for determining that an event associated with system latency has occurred and for placing the vehicle in a safe state in response to the event. For example, some or all of the process 600 can be performed by the diagnostics system 132 shown in FIG. 1 and/or by one or more of the components illustrated in FIG. 5. For example, some or all of the process 600 can be performed by the vehicle computing system(s) 504 (e.g., using the diagnostics system 530) and/or by the remote computing system(s) 544 (e.g., by the diagnostics system 550).

At operation 602, the process 600 can include receiving tag information from individual subsystems, the tag information including unique IDs and timestamp information. For example, and as described herein, a system of an autonomous vehicle may generate data packets and output those data packets for downstream use and/or additional processing. In examples, each instance of new, e.g., generated, data is tagged with a unique ID. Accordingly, each unique ID identifies a different instance of data, e.g., a discrete data packet, introduced into the system. The timestamp information may include a timestamp designating a time at which the packet (or the underlying data in the packet) was generated and/or a timestamp designating a time at which the new data was output by the system. As described above with reference to FIG. 1, as the data is acted on, e.g., processed, by one or more systems, timestamps and system identification information may be added to the tag(s) associated with the generated data. In this example, the timestamp information may include one or more timestamps designating one or more times at which the data was received by the system. Thus, and using the example of FIG. 1, the operation 602 may include receiving one of the tags the tag 122*a*, e.g., at the latency determination component 134 of the diagnostics system 132.

At operation 604, the process 600 includes determining a latency of the one or more subsystems based on the tag information. For example, latency of one or more subsystems of an autonomous vehicle can be determined by comparing timestamps associated with certain data as that data propagates through the subsystems. In one example, and with specific reference to FIG. 1, the unique ID 126*b* is associated with the data 108 when the data 108 is generated/output. Moreover, as the data 108 propagates through the various systems of the vehicle, those systems update the original tags and/or generate new tags that include the unique ID 126*b*, new timestamp information (associated with that system), and system identification information (e.g., to associate the times with the system(s)), e.g., the data 116 and the data 118, and to additional tags associated with data generated indirectly from the data 108, e.g., the data 120 that uses the data 116 and the data 118 (and therefore indirectly uses the data 108). Thus, the latency of the system that includes the first computing system 110, the second computing system 112, and the third computing system 114 can be determined by tracking the data 108 (in this example) through those systems. Of course, this is one simplistic example used for illustration only; the techniques described herein, which use the tags including the unique identifiers and the timestamps can allow for readily tracking latency through complex systems, such as the autonomous vehicle 102. As described herein, the latency may be an instantaneous or near-instantaneous latency, or the latency may be determined according to a statistical analysis performed on data (or tags) collected over a time window.

At operation 606, the process 600 can include determining whether the latency is within an acceptable range. For example, as noted above, complex computing systems, such as autonomous vehicles, may include a number of subsystems working together. To ensure proper operation, each subsystem may be required to operate within a specific latency range. For example, the subsystem may be required to output data in a timely fashion for further processing by additional, downstream components of the system. Thus, each subsystem may have its own latency range, which may be determined according to techniques described herein, although different subsystems may have similar or the same ranges.

If, at operation 606 it is determined that the accepted latency determined at operation 604 is within the acceptable range, at operation 608 the process 600 includes controlling the vehicle according to command signals. For example, if each subsystem is operating within an acceptable range, the system, e.g., the vehicle, may be controlled using the processes associated with the subsystem.

Alternatively, if at operation 606 it is determined that the latency determined at operation 604 is outside the acceptable latency range, e.g., because the latency was too far below the minimum threshold or, more likely, the latency is above a maximum latency tolerance, at operation 610 the process 600 can determine an event associated with the subsystem(s). As noted above, failure of the systems of the vehicle to receive, process, generate, and/or output data timely may create an unsafe operating condition.

Accordingly, at operation 612, the process 600 can include controlling the vehicle according to a safe state. For example, when it is determined at operation 606 that an anomalous latency event has occurred, techniques described herein can control the vehicle to mitigate the potentially unsafe condition. As described herein, implementing the safe state can include taking any number of actions, including but not limited to, signaling that the latency event has occurred, taking actions to limit non-critical functions, e.g., to alleviate undue network traffic and or processing, slowing the vehicle, executing a safe stop trajectory, or placing the vehicle in a state in which operations of the vehicle are disabled, or the like.

Figure 7:
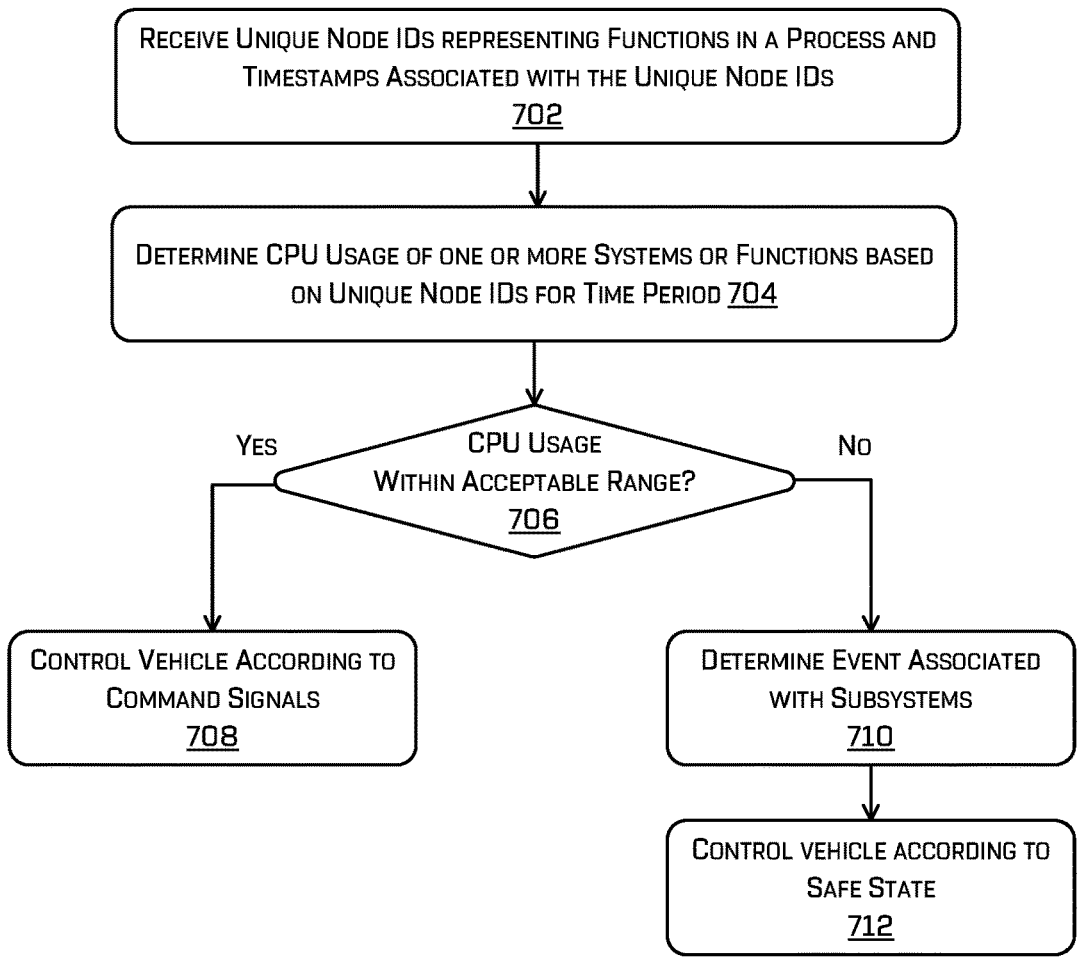
FIG. 7 is a flowchart illustrating an example method for generating latency data for a system, as described herein.

FIG. 7 depicts another example process 700 for determining that an event associated with system CPU usage has occurred and for placing the vehicle in a safe state in response to the event. For example, some or all of the process 700 can be performed by one or more of the components illustrated in FIG. 5. For example, some or all of the process 700 can be performed by the vehicle computing system(s) 504 (e.g., using the diagnostics system 530) and/or by the remote computing system(s) 544 (e.g., by the diagnostics system 550).

At operation 702, the process 700 includes receiving unique node IDs representing functions in one or more processes and/or timestamp information associated with the unique node IDs. For example, and as described herein, processes and/or functions performed by an autonomous vehicle may be represented as a data structure, e.g., a prefix tree, and individual nodes in the data structure may be associated with individual functions. In examples, each node may also have an associated unique node ID. Accordingly, each unique node ID identifies a function associated with data process. Because each node has a unique node ID, and the data structure is known, an associated stack trace may be determined from the unique node ID alone. The timestamp information may include a timestamp designating a time at which the unique node ID was sampled during a sampling process, described herein. As illustrated in FIG. 3, the unique node IDs and timestamps can be stored as packets 328. Thus, the operation 702 may include receiving the packets 328, e.g., at a CPU usage component 534 of the diagnostics system 530.

At operation 704, the process 700 includes determining a CPU usage of one or more systems or functions based on the unique node IDs for a time period. For example, the unique nodes for each of a plurality of sample times in the time period may be used to recreate stack traces, therefore identifying the functions occupying the CPU. Aggregating this data for the entire time period may result in an identification of CPU usage for each function relative to all other functions. As a non-limiting example, a percentage of CPU usage may be determined based at least in part on the number of times a function was called relative to all calls and/or a determination of the associated stack trace.

At operation 706, the process 700 can include determining whether the CPU usage is within an acceptable range. For example, as noted above, complex computing systems, such as autonomous vehicles, may include a number of subsystems working together (which may not operate in a linear manner). To ensure proper operation, each subsystem may be required to operate within a specific CPU usage range. Thus, each subsystem may have its own CPU-usage range, which may be determined according to techniques described herein. Different subsystems may have similar or the same CPU-usage ranges.

If, at operation 706 it is determined that the CPU-usage determined at operation 704 is within the acceptable range, at operation 708, the process 700 includes controlling the vehicle according to command signals. For example, if each subsystem is operating within an acceptable range, the system, e.g., the vehicle may be controlled using the processes associated with the subsystem.

Alternatively, if at operation 706 it is determined that the CPU-usage determined at operation 704 is outside the acceptable CPU range, e.g., because the CPU usage was too far below the minimum threshold or, more likely, the CPU-usage is above a maximum usage tolerance, at operation 710 the process 700 can determine an event associated with the subsystem(s). As noted above, failure of the systems of the vehicle to receive, process, generate, and/or output data timely may create an unsafe operating condition.

Accordingly, at operation 712, the process 700 can include controlling the vehicle according to a safe state. For example, when it is determined at operation 706 that an anomalous CPU usage event has occurred, techniques described herein can control the vehicle to mitigate the potentially unsafe condition. As described herein, implementing the safe state can include taking any number of actions, including but not limited to, signaling that the latency event has occurred, taking actions to limit non-critical functions, e.g., to alleviate undue network traffic and or processing, slowing the vehicle, executing a safe stop trajectory, or placing the vehicle in a state in which operations of the vehicle are disabled, or the like.

Figure 8:
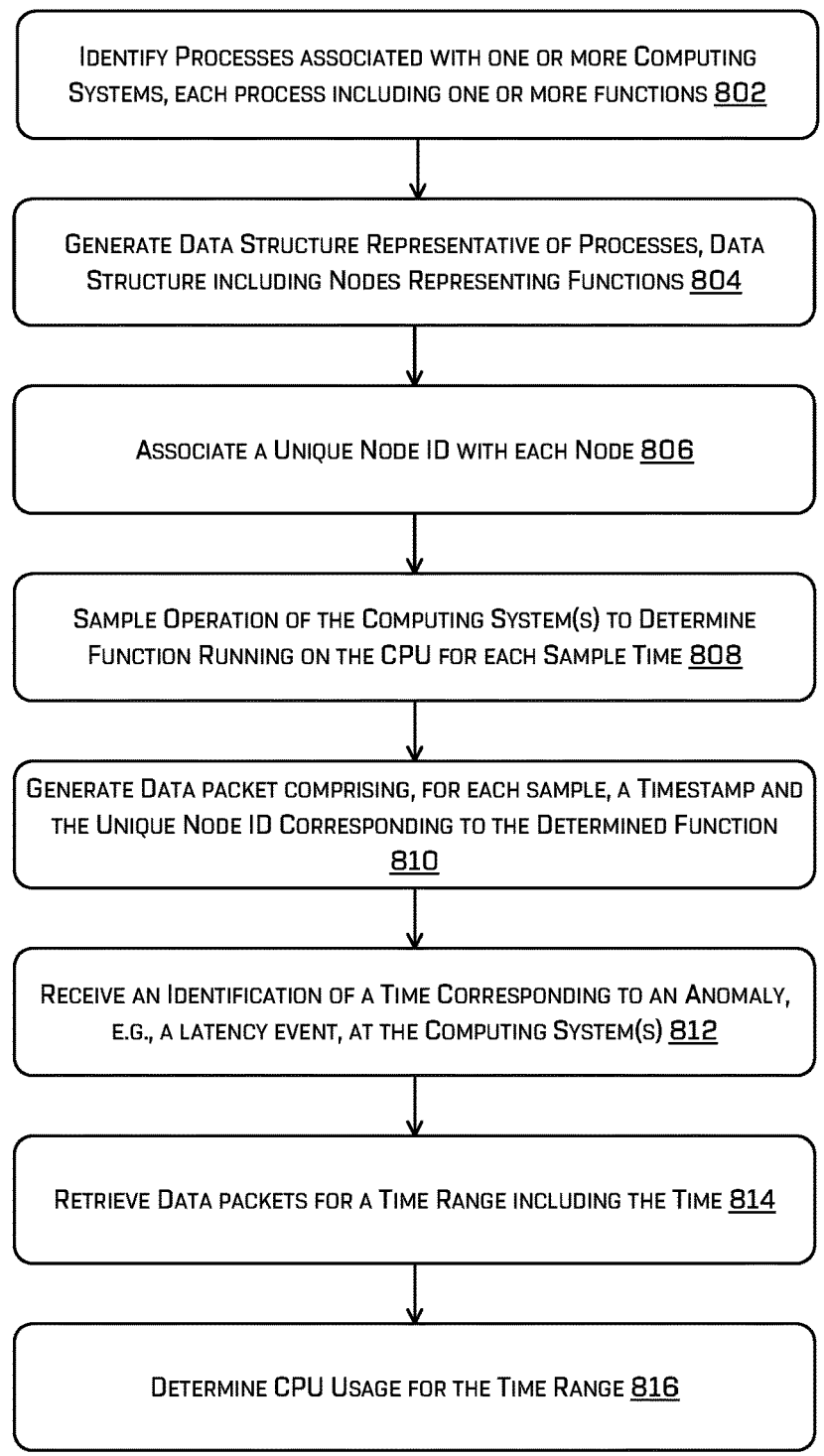
FIG. 8 is a flowchart illustrating an example method for transitioning to a safe stop in response to detecting a CPU usage event, as described herein.

FIG. 8 depicts an example process 800 for determining CPU usage according to examples of this disclosure. For example, some or all of the process 800 can be performed by one or more of the components illustrated in FIG. 5. For example, some or all of the process 800 can be performed by the vehicle computing system(s) 504 (e.g., using the CPU usage system 534) and/or by the remote computing system(s) 544 (e.g., by the CPU usage system 554).

At operation 802, the process 800 includes identifying processes associated with one or more computing systems, each of the processes including one or more functions. For example, complex systems, such as an autonomous vehicle, including a number of subsystems performing different computing processes and functions. The operation 802 may identify these processes and individual functions. An example illustrated in FIG. 3, the techniques described herein can generate a simple table that associates a unique function identifier with each computing function carried out by the vehicle.

At operation 804, the process 800 can include generating a data structure representative of the processes, the data structure including nodes representing the functions. For example, techniques described herein can generate a data structure such as a prefix tree that characterizes all processes and functions carried out by the vehicle. A prefix tree data structure may include a number of branches, each of the branches representing a stack trace in which each of the nodes represents a function or stack frame. Also in implementations described herein, the data structure can store the unique function identifiers as the nodes. As described further herein, although the vehicle includes a relatively complex interaction between systems, functions can be the same across multiple systems, and individual of the systems perform the same operations repeatedly. Accordingly, each of the processes and functions can be determined in a relatively short period of time e.g. by observing operation of the vehicle, and a substantially complete prefix tree can be generated therefrom.

At operation 806, the process 800 can associate a unique node ID with each node. For example, and as illustrated in FIG. 3, once the data structure (e.g., the prefix tree) is generated, techniques described herein can assign each node a unique node ID. For example, the unique node IDs may be unique integers. In some implementations, the unique node IDs are used to disambiguate between the same function in different systems and/or processes, as described further herein.

At operation 808, the process 800 can sample an operation of the computing systems to determine a function running on the CPU at each sample time. For example, techniques described herein can determine the node ID is on the CPU at each sampling. An example of sampling according to techniques described herein is illustrated along the timeline of FIG. 3. As also described herein, sampling can be done at any frequency, although in some implementations the frequency may be chosen as a frequency different from one or more operating frequencies of one or more systems of the vehicle.

As described herein, the using the data structure generated at operation 804, the samples obtained at operation 808 may be used to generate information about the functions utilizing the CPU. More specifically, using the unique node IDs, stack traces associated with the on-CPU functions can be re-created across the entire time in which the samples are collected and/or portions thereof. For example, the CPU usage can be used to generate a graph such as the flame chart 400*a* illustrated in the example 4A, and described above. Moreover, although FIG. 8 shows operations 802, 804, 806, and 808 being performed in series, some or all of those operations may be performed in parallel. By way of non-limiting example, in some instances techniques described herein can identify the functions, build the data structure, and/or assign the unique node IDs based on the results of the sampling. For example, because many processes on the vehicle may repeat at a relatively high frequency, all functions may be sampled over a relatively short period of time, and the data structure can be gleaned from the sampling.

At operation 810 the process 800 can generate data packets comprising, for each sample, a timestamp and/or the unique node ID corresponding to the determined function. For example, as noted above, the function determined at 808 has a corresponding unique node ID, and the operation 810 can associate that unique node ID with a timestamp, e.g., corresponding to a time of the sample. An example of data packets that may be generated at operation 810 is illustrated in FIG. 3.

At operation 812, the process 800 can receive an identification of time corresponding to an anomaly, e.g., a latency event, at the computing system(s). For example, the process 600, described above, may be used to determine latency events and take actions based on those latency events. However, it may be useful in some implementations to discern a source of the latency. As noted above respect to the discussion of the process 600, times associate with latency events can be determined, and such a time may be received at 812. Of course, a time associated with the latency event is only one example. In other examples, the operation 812 may receive a time corresponding to any other event. Or, the time may be a random or periodic sampling time e.g., to allow the process 800 to perform a systematic check of on-CPU processes and systems.

At operation 814, the process 800 can include retrieving data packets for a time range including the time. For example, because the data packets have an associated timestamp, packets having timestamps within a determined range may be readily retrieved for investigation. In some examples, when a specific time is provided at the operation 812, a time frame of from about one to about four seconds may be determined as a range for investigating CPU usage, and the operation 814 may retrieve data packets for that time range. In some examples, the range may be longer or shorter. As will be appreciated, however, the techniques described herein provide for ready retrieval of usage data for any timeframe. Moreover, because the data can be accessed off-vehicle, performance of similar systems and/or software on different vehicles can be tested and/or used to determine ranges, events, or the like, as described herein.

At operation 816, the process 800 can determine CPU usage during the time range. For example, and as described further herein, the unique node IDs contained in the packets retrieved at 814 can be used to re-create the on-CPU processes for the time range because each unique node ID can be treated as a leaf node corresponding to the sample time. Moreover, the data structure can be used to re-create the stack trace associated with that leaf node. In some examples, the operation 816 can include generating a flame graph or other visualization of the CPU usage for the time range. Because the techniques described herein can provide on-demand information about CPU usage for any time or operation of the vehicle, or subsystems of the vehicle. Accordingly, techniques described herein can allow for diagnostic and troubleshooting, for example.

Figure 9:
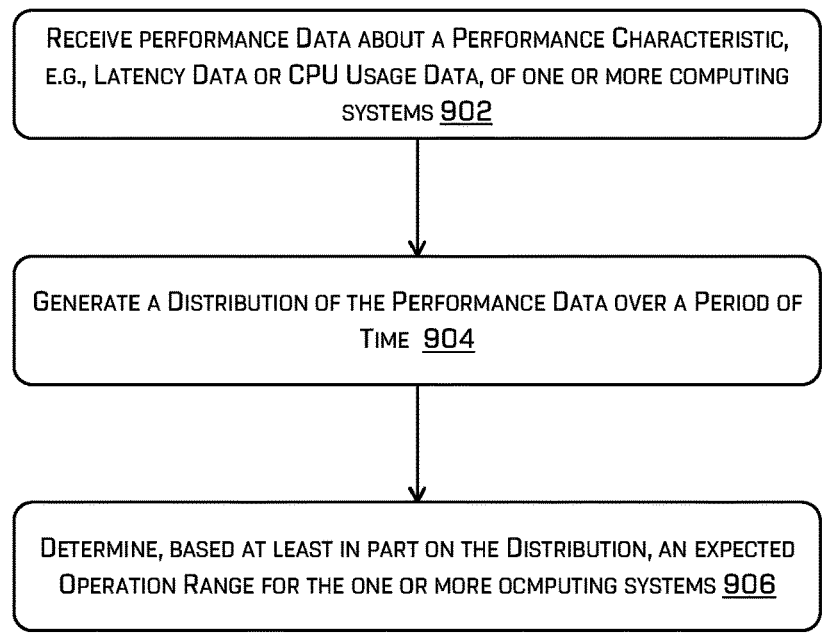
FIG. 9 is a flowchart illustrating an example method for determining CPU usage for a system and defining safe operating procedures relative to CPU usage for an autonomous vehicle, as described herein.

FIG. 9 illustrates a process 900 of determining threshold operational ranges for various performance characteristics. For example, the process 900 can be used to determine an expected or target latency range for one or more systems and/or to determine unexpected or target CPU usage range for one or more systems. In some examples, the process 900 can be performed by one or more of the components illustrated in FIG. 5. For example, some or all of the process 900 can be performed by the vehicle computing system(s) 504 (e.g., using the diagnostics system 530) and/or by the remote computing system(s) 544 (e.g., by the diagnostics system 550).

At operation 902, the process 900 can include receiving performance data about a performance characteristic, e.g. latency data or CPU usage data, of one or more computing systems. For example, the operation 902 can include receiving latency data determined according to processes described above, including in connection with FIGS. 1 and 2A. Alternatively or additionally, the operation 902 can include receiving CPU-usage data as discussed in connection with FIGS. 3 and 4A. Techniques described herein may allow for considering information on a system-by-system basis, for one or more time ranges, or the like. In at least one example, the graph 200a illustrated in FIG. 2A illustrates the receipt of latency data generated by tracking data as it flows through a system. Although specific examples of latency and CPU usage are provided as the performance characteristics, other performance characteristics may also be of interest, and can be received and processed according to the process 900.

At operation 904, the process 900 includes generating a distribution of performance data over a period of time. For example, a distribution of latency data is illustrated in FIG. 2B, and a distribution of CPU usage data is illustrated in FIG. 4B. Of course, these illustrate examples, and other distributions may vary.

At operation 906, the process 900 can include determining, based at least in part of the distribution, an expected operation range for the one or more computing systems. For example, the expected operation range may be a range in which the operational parameter, e.g. the latency or the CPU usage data, is likely to be. For example, the range may be the range corresponding to some statistical certainty in which the performance characteristic falls when the system is functioning properly. As described herein, the range may be used to determine anomalous events, which can be used to control the vehicle to ensure safe operation.

Other diagnostic functions also may be performed using the ranges determined according to the process 900. For example, simulations run on different versions of software may be analyzed using the process 900, with the ranges being compared across the versions. Accordingly, it may be possible to determine an affect the new software will have on operation of the system and/or the vehicle as a whole.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

EXAMPLE CLAUSES

A: An example autonomous vehicle includes: a first component configured to perform one or more first processes; a second component configured to perform one or more second processes, the one or more first processes and the one or more second processes including a plurality of functions; one or more processors; and memory storing one or more computer-readable media storing instructions executable by the one or more processors to perform acts comprising: querying the one or more processors at a frequency to determine a plurality of running functions; determining, based at least in part on a data structure representative of the one or more first processes and the one or more second processes, unique node identifiers associated with the plurality of running functions; associating timestamps with the unique node identifiers; determining, based at least in part on the unique node identifiers and the timestamps, a first CPU usage of the first computing system and a second CPU usage of the second computing system; determining an event associated with the autonomous vehicle based at least in part on the first CPU usage being equal to or greater than a first threshold CPU usage or the second CPU usage being equal to or greater than a second threshold CPU usage; and controlling, based at least in part on the event, the autonomous vehicle in a safe state.

B: The autonomous vehicle of example A, the acts further comprising: storing the unique node identifiers and the associated timestamps as CPU usage packets; receiving an indication of a time associated with an anomalous vehicle event; retrieving a plurality of the CPU usage packets corresponding to a time range including the time; and determining, based at least in part on the plurality of the CPU usage packets, a CPU usage for the time range.

C: The autonomous vehicle of example A or example B, wherein: the time range is between about one second and about four seconds; the determining the CPU usage for the time range comprises determining a CPU usage for one or more functions of the plurality of functions executed during the time range; and the determining the CPU usage for the one or more functions comprises determining a percentage of usage associated with the one or more functions relative to other of the plurality of running functions determined in the time range.

D: The autonomous vehicle of any one of example A through example C, wherein the data structure comprises a plurality of nodes, individual of the plurality of nodes including a function identifier identifying a function of the plurality of functions and having an associated one of the unique node identifiers.

E: The autonomous vehicle of any one of example A through example D, wherein the controlling the autonomous vehicle in the safe state comprises at least one of: controlling the vehicle to come to a safe stop; disabling features of the vehicle in a state in which the autonomous vehicle is stopped; reducing a speed of the vehicle; or controlling the vehicle to maintain a speed below a threshold speed.

F: An example system includes: a first subsystem configured to perform first processes; a second subsystem configured to perform second processes, the first processes and the second processes comprising a plurality of functions; one or more processors; and memory storing computer-readable instructions that, when executed, cause the system to perform acts comprising: generating a data structure representative of the first processes and the second processes, the data structure including a plurality of nodes, individual of the nodes comprising a function identifier identifying a function of the plurality of functions; associating node identifiers with the nodes, the node identifiers including information about a relationship of the plurality of functions in the first process and the second process; querying, at a frequency, the one or more processors to determine running functions of the first computing system and the second computing system; and generating, based on the sampling, a plurality of data packets, individual of the plurality of data packets including a node identifier of the node identifiers corresponding to a function of the plurality of functions operating at the sampling time.

G: The system of example F, the acts further comprising: determining a time range; retrieving data packets of the plurality of data packets for the time range; determining, based at least in part on the data packets, a relative CPU usage during the time range of each of the running functions associated with the node identifiers; and determining, based at least in part on the relative CPU usage, a first CPU usage of the first subsystem and a second CPU usage of the second subsystem.

H: The system of example F or example G, the acts further comprising: determining that at least one of the first CPU usage is greater than a first threshold CPU usage or the second CPU usage is greater than a second threshold CPU usage, the first threshold and the second threshold CPU usage being determined based at least in part on a statistical analysis of the first processes and the second processes over a time period preceding the time range, determining an event based at least in part on the first CPU usage being greater than the first threshold CPU usage or the second CPU usage being greater than the second threshold CPU usage.

I: The system of any one of example F through example H, wherein the system comprises an autonomous vehicle, the acts further comprising: controlling, based at least in part on the event, the autonomous vehicle in a safe state.

J: The system of any one of example F through example I, wherein the safe state comprises at least one of: controlling the vehicle to come to a safe stop; disabling features of the vehicle in a state in which the autonomous vehicle is stopped; or emitting at least one of an audible output or a visual output.

K: The system of any one of example F through example J, wherein the time range is a first time range and the first subsystem is configured in a first configuration for the first time range, the acts further comprising: determining a second time range, the first subsystem being configured in a second configuration for the second time range, retrieving second data packets of the plurality of data packets for the second time range; determining, based at least in part on the second data packets, a relative CPU usage during the second time range of each of the running functions associated with the node identifiers; and determining, based at least in part on the relative CPU usage, a third CPU usage of the first subsystem.

L: The system of any one of example F through example K, wherein the system comprises an autonomous vehicle, the acts further comprising: determining, based at least in part on the first CPU usage and the third CPU usage, a vehicle configuration including the first configuration or the second configuration; and controlling the autonomous vehicle according to the vehicle configuration.

M: The system of any one of example F through example L, wherein the determining the vehicle configuration comprises determining the vehicle configuration including the second configuration in response to determining that the third CPU usage is lower than the first CPU usage.

N: The system of any one of example F through example M, the acts further comprising: determining a plurality of time ranges; retrieving data packets of the plurality of data packets for individual of the time ranges; determining, based at least in part on the data packets, a relative CPU usage during individual of the time ranges of each of the running functions associated with the node identifiers; determining, based at least in part on the relative CPU usage, a first CPU usage of the first subsystem and a second CPU usage of the second subsystem for individual of the time ranges; determining a first CPU usage range for the first subsystem; and determining a second CPU usage range for the second subsystem.

O: The system of any one of example F through example N, wherein at least one of the determining the first CPU usage or the determining the second CPU usage comprises performing a statistical analysis of the at least one of the first CPU usage or the second CPU usage for the individual of the time ranges, the performing the statistical analysis comprising determining at least one of a distribution function representative of the CPU usage, a mean CPU usage, or a maximum CPU usage.

P: An example non-transitory computer-readable storage medium stores instructions that are executable by one or more processors to perform acts including: generating a data structure representative of first processes running on a first system and second processes running on a second system, the first processes and the second processes including a plurality of functions and the data structure including a plurality of nodes, individual of the nodes comprising a function identifier identifying a function of the plurality of functions; associating node identifiers with the nodes, the node identifiers including information about a relationship of the plurality of functions in the first process and the second process; querying, at a frequency, the one or more processors to determine running functions of the first computing system and the second computing system; and generating, based on the querying, a plurality of data packets, individual of the plurality of data packets including a node identifier of the node identifiers corresponding to a running function of the running functions.

Q: The non-transitory computer-readable medium of example P, the acts further comprising: determining a time range; retrieving data packets of the plurality of data packets for the time range; determining, based at least in part on the data packets, a relative CPU usage during the time range of each of the running functions associated with the node identifiers; and determining, based at least in part on the relative CPU usage, a first CPU usage of the first subsystem and a second CPU usage of the second subsystem.

R: The non-transitory computer-readable medium of example P or example Q, the acts further comprising: determining that at least one of the first CPU usage is greater than a first threshold CPU usage or the second CPU usage is greater than a second threshold CPU usage, the first threshold and the second threshold CPU usage being determined based at least in part on a statistical analysis of functioning of the first processes and the second processes over one or more time periods preceding the time range; and determining an event based at least in part on the first CPU usage being greater than the first threshold CPU usage or the second CPU usage being greater than the second threshold CPU usage.

S: The non-transitory computer-readable medium of any one of example P through example R, wherein the time range is a first time range and the first subsystem is configured in a first configuration for the first time range, the acts further comprising: determining a second time range, the first subsystem being configured in a second configuration for the second time range; retrieving second data packets of the plurality of data packets for the second time range; determining, based at least in part on the second data packets, a relative CPU usage during the second time range of each of the running functions associated with the node identifiers; and determining, based at least in part on the relative CPU usage, a third CPU usage of the first subsystem.

T: The non-transitory computer-readable medium of any one of example P through example S, the acts further comprising: controlling, based at least in part on the third CPU usage being lower than the first CPU usage, an autonomous vehicle according to the second configuration.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A vehicle comprising:
a first component configured to generate first data;
a second component configured to generate second data;
a control system coupled to the first component and the second component, the control system configured to control a function of the vehicle;
one or more non-transitory computer-readable media storing instructions that, when executed by the one or more processors, cause the vehicle to perform acts comprising:
receiving a message at the control system, the control system configured to output a control message based at least in part on the message, wherein the message comprises:
a first identification of the first component of the system, a first timestamp associated with an instance of the first data, a second identification of the second component of the system, and a second timestamp associated with an instance of the second data;
determining, based at least in part on the first identification, the first timestamp, the second identification, and the second timestamp, a latency associated with the message, the first component, and the second component; and
controlling, by the control system and based at least in part upon the control message and the latency, the function of the vehicle.

2. The vehicle of claim 1, the acts further comprising:
comparing the latency to a nominal latency associated with the vehicle;
determining, based at least in part on the comparing, the latency to be an anomalous latency;
determining, based at least in part on the anomalous latency, an event associated with the vehicle; and
wherein the controlling is based at least in part on the event.

3. The vehicle of claim 2, wherein:
the nominal latency comprises an expected latency range associated with the control system, the first component, or the second component; and
the determining the latency to be the anomalous latency comprises determining the latency to be outside the expected latency range.

4. The vehicle of claim 3, wherein the determining the latency to be outside the expected latency range comprises at least one of:
comparing an average latency to an expected latency,
comparing a maximum latency with a maximum expected latency, or
comparing a latency variance with an expected latency variance.

5. The vehicle of claim 2, wherein, in response to determining the event, the controlling the vehicle comprises at least one of:
controlling the vehicle to execute a safe stop;
controlling the vehicle to reduce a current speed;
controlling the vehicle to reduce a maximum speed; or
controlling the vehicle to follow a trajectory.

6. The vehicle of claim 1, wherein the determining the latency comprises:
performing a statistical analysis on tag information associated with a plurality of control messages including the control message.

7. The vehicle of claim 6, wherein the tag information includes at least the first identification, the first timestamp, the second identification, the second timestamp, a control system identification, and a control system timestamp.

8. The vehicle of claim 1, further comprising a third component, wherein:
   the message is a first message; and
   the control system is further configured to receive a second message and to output the control message based at least in part on the second message, the second message including:
   the first identification, the first timestamp, a third identification associated with the third component, and a third timestamp associated with the third component, wherein the second message excludes the second identification and the second timestamp.

9. The vehicle of claim 1, wherein the first component or the second component comprises at least one of:
   a sensor system;
   a perception computing system;
   a planning system;
   a localization system; or
   a system controller.

10. The vehicle of claim 1, wherein:
    the first component comprises a machine-learned model configured to receive sensor data from a plurality of sensors and to generate data associated with the vehicle; and
    the latency comprises a latency associated with the first component.

11. A method comprising:
    receiving, at a vehicle controller, a message, the vehicle controller being configured to generate and output a vehicle control message for controlling a function of a vehicle based at least in part on the message, wherein the message comprises:
    a first identification associated with an instance of first data generated by a first component of the vehicle, a first timestamp associated with the instance of the first data, a second identification associated with an instance of second data generated by a second component of the vehicle, a second timestamp associated with the instance of the second data, a system identification associated with a processing system configured to generate processed data based on the first data and the second data, and a third timestamp associated with an instance of the processed data;
    determining, based at least in part on the message, a latency associated with at least one of the first component, the second component, or the processing system; and
    controlling, based at least in part on the latency and the control message, the vehicle.

12. The method of claim 11, the acts further comprising:
    determining the latency to be an anomalous latency; and
    determining, based at least in part on the anomalous latency, an event associated with the vehicle; and
    wherein the controlling is based at least in part on the event.

13. The method of claim 12, wherein the determining the latency to be the anomalous latency comprises at least one of:
    comparing the latency to a nominal latency for the vehicle,
    comparing the latency to a maximum expected latency for the vehicle, or
    comparing a variance associated with the latency with an expected latency variance for the vehicle.

14. The method of claim 12, wherein, in response to determining the event, the controlling the vehicle comprises at least one of:
    controlling the vehicle to execute a safe stop;
    controlling the vehicle to reduce a current speed;
    controlling the vehicle to reduce a maximum speed; or
    controlling the vehicle to follow a trajectory.

15. The method of claim 11, wherein the determining the latency comprises:
    performing a statistical analysis on tag information associated with the vehicle control message and on additional tag information associated with a plurality of additional vehicle control messages.

16. The method of claim 15, wherein the tag information includes at least the first identification, the first timestamp, the second identification, the second timestamp, the system identification, and the third timestamp.

17. A non-transitory computer-readable medium storing instructions, the instructions being executable by one or more processors to perform acts comprising:
    receiving, at a vehicle controller, a message, the vehicle controller being configured to generate and output a vehicle control message for controlling a function of a vehicle based at least in part on the message, wherein the message comprises:
    a first identification associated with an instance of first data generated by a first component of the vehicle, a first timestamp associated with the instance of the first data, a second identification associated with an instance of second data generated by a second component of the vehicle, a second timestamp associated with the instance of the second data, a system identification associated with a processing system of the vehicle, the processing system being configured to generate processed data based on the first data and the second data, and a third timestamp associated with an instance of the processed data;
    determining, based at least in part on the message, a latency associated with at least one of the first component, the second component, or the processing system; and
    controlling, based at least in part on the latency and the control message, the vehicle.

18. The non-transitory computer-readable medium of claim 17, wherein the message is a first message, the acts further comprising:
    receiving, at the vehicle controller, a second message from a second processing system of the vehicle and to output the control message based at least in part on the second message, the second message including:
    a third identification associated with a second instance of the first data, a fourth timestamp associated with the second instance of the first data, a third identification associated with an instance of third data generated by a third component, and a fifth timestamp associated with the instance of the third data, wherein the second message excludes the second identification and an additional timestamp associated with the second component.

19. The non-transitory computer-readable medium of claim 18, wherein the control message comprises the first timestamp, the second timestamp, the third timestamp, the fourth timestamp, and the fifth timestamp.

20. The non-transitory computer-readable medium of claim 16, the acts further comprising:

determining the latency to be an anomalous latency; and
determining, based at least in part on the anomalous latency, an event associated with the vehicle,
wherein the controlling is based at least in part on the event.

\* \* \* \* \*